(12) United States Patent
Kim et al.

(10) Patent No.: US 12,553,649 B2
(45) Date of Patent: Feb. 17, 2026

(54) AIR CONDITIONER

(71) Applicant: LG ELECTRONICS INC., Seoul (KR)

(72) Inventors: Jusu Kim, Seoul (KR); Sungoh Choi, Seoul (KR); Beomchan Kim, Seoul (KR); Hyeri Park, Seoul (KR); Hyungsoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 345 days.

(21) Appl. No.: 18/136,015

(22) Filed: Apr. 18, 2023

(65) Prior Publication Data

US 2024/0183593 A1 Jun. 6, 2024

(30) Foreign Application Priority Data

Dec. 2, 2022 (KR) .................. 10-2022-0167007

(51) Int. Cl.
*F25B 5/02* (2006.01)
*F25B 13/00* (2006.01)
(Continued)

(52) U.S. Cl.
CPC .............. *F25B 41/26* (2021.01); *F25B 13/00* (2013.01); *F25B 41/40* (2021.01); *F25B 47/00* (2013.01);
(Continued)

(58) Field of Classification Search
CPC .. F25B 5/02; F25B 13/00; F25B 39/02; F25B 41/26; F25B 47/022; F25B 2313/0272;
(Continued)

(56) References Cited

U.S. PATENT DOCUMENTS 5,040,376 A * 8/1991 Ueno ............... F25B 13/00
165/205
5,050,396 A * 9/1991 Ohkoshi ........... F24F 11/67
62/181
(Continued)

FOREIGN PATENT DOCUMENTS

CN 111023454 A * 4/2020
JP WO2020/202246 12/2021
(Continued)

OTHER PUBLICATIONS

Korean Notice of Allowance dated Mar. 26, 2025 issued in Application No. 10-2022-0167007.

*Primary Examiner* — Jianying C Atkisson
(74) *Attorney, Agent, or Firm* — KED & ASSOCIATES, LLP

(57) ABSTRACT

An air conditioner includes an outdoor unit comprising a compressor and an outdoor heat exchanger, and an indoor unit connected to the outdoor unit and provided with an indoor heat exchanger. The indoor unit includes a first refrigerant flow tube connecting an inlet side of the indoor heat exchanger to the outdoor unit, a second refrigerant flow tube connecting an outlet side of the indoor heat exchanger to the outdoor unit, a first bypass tube branched from a first branch point of the first refrigerant flow tube and joined to a first joining point of the second refrigerant flow tube, a second bypass tube branched from a second branch point of the first refrigerant flow tube and joined to a second joining point of the second refrigerant flow tube, and a flow switching valve disposed between the first and second joining points of the second refrigerant flow tube.

18 Claims, 17 Drawing Sheets

(51) Int. Cl.
    *F25B 41/26*     (2021.01)
    *F25B 41/40*     (2021.01)
    *F25B 47/00*     (2006.01)
    *F25B 47/02*     (2006.01)
    *F25B 39/00*     (2006.01)

(52) U.S. Cl.
    CPC ............ *F25B 47/022* (2013.01); *F25B 39/00* (2013.01); *F25B 2313/027* (2013.01); *F25B 2400/0403* (2013.01); *F25B 2400/0409* (2013.01); *F25B 2600/2501* (2013.01)

(58) Field of Classification Search
    CPC .... F25B 2313/02791; F25B 2400/0403; F25B 2400/0409; F28G 13/00; F28F 17/00; F28F 27/00; F28F 27/02
    See application file for complete search history.

(56) References Cited

U.S. PATENT DOCUMENTS

| | | | |
|---|---|---|---|
| 5,107,684 A * | 4/1992 | Nakayama | F24F 3/065 |
| | | | 62/81 |
| 7,644,754 B2 * | 1/2010 | Veltkamp | F28F 19/006 |
| | | | 165/267 |
| 10,288,328 B2 * | 5/2019 | Yang | F24F 5/00 |
| 10,415,861 B2 * | 9/2019 | Takenaka | F25B 47/025 |
| 10,571,159 B2 * | 2/2020 | Saito | F25B 49/02 |
| 11,365,914 B2 * | 6/2022 | Tanaka | F25B 13/00 |
| 2020/0309392 A1 * | 10/2020 | Kim | F24F 1/0063 |
| 2023/0358446 A1 * | 11/2023 | Murata | F25B 41/20 |

FOREIGN PATENT DOCUMENTS

| | | | |
|---|---|---|---|
| KR | 10-2018-0053899 | 5/2018 | |
| KR | 10-2021-0087291 | 7/2021 | |
| KR | 20210087291 A * | 7/2021 | ............. F24F 11/83 |

* cited by examiner

AIR CONDITIONER

CROSS-REFERENCE TO RELATED APPLICATION(S)

The present application claims priority under 35 U.S.C. §§ 119 and 365 to Korean Patent Application No. 10-2022-0167007, filed in Korea on Dec. 2, 2022, which is hereby incorporated by reference in its entirety.

BACKGROUND

1. Field

An air conditioner is disclosed herein.

2. Background

In general, an air conditioner may refer to a device that performs cooling and/or heating operations in an indoor space using components of a refrigerant cycle, such as a compressor, a condenser, an expansion device, and an evaporator to create a more comfortable indoor environment for a user. In the case of a heat exchanger provided in an indoor unit of the air conditioner, contaminants contained in an air flow (e.g., an air flow generated by an indoor fan) may accumulate on a surface of the heat exchanger, and when the cooling operation is performed, condensed water generated on the surface of contaminants may cause a release of undesirable odors associated with the accumulated contaminants.

In order to address this release of undesirable odors, a control method for cleaning a heat exchanger provided in an indoor unit of an air conditioner is disclosed in Korean Patent Publication No. 10-2021-0087291. The control method includes identifying a freezing mode according to detected relative humidity, controlling an indoor fan and a compressor to operate in the identified freezing mode, identifying a defrosting mode according to the detected relative humidity during the freezing mode, and controlling the indoor fan to operate in the identified defrosting mode.

However, the control method has various limitations. First, it is difficult to uniformly freeze the entire heat exchanger provided in the indoor unit of the air conditioner, and thus, the contaminants may remain as it is on a portion of the heat exchanger to generate odor due to the condensed water. Second, in the case of the winter season when an outdoor temperature is low, a low pressure may drop abruptly to reduce reliability of the compressor and make it difficult to freeze the heat exchanger. Third, when the freezing is performed under high humidity conditions, a fog mist may occur. Fourth, a drying time may increase due to blowing and drying, and there may be a risk of bacterial propagation due to incomplete drying.

BRIEF DESCRIPTION OF THE DRAWINGS

Embodiments will be described in detail with reference to the following drawings in which like reference numerals refer to like elements, and wherein.

DETAILED DESCRIPTION

Reference will now be made in detail to the embodiments of the present disclosure, examples of which are illustrated in the accompanying drawings. In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the scope of the invention. To avoid detail not necessary to enable those skilled in the art to practice the invention, the description may omit certain information known to those skilled in the art. The following detailed description is, therefore, not to be taken in a limiting sense.

Also, in the description of embodiments, terms such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

Figure 1:
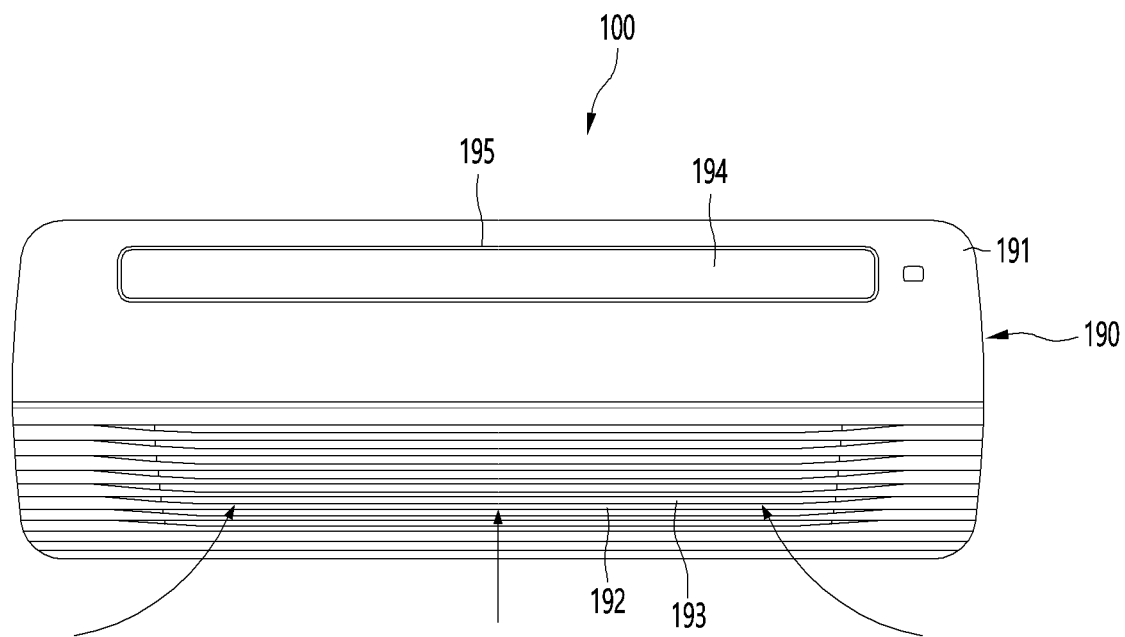
FIG. 1 is a front view illustrating an indoor unit of an air conditioner according to an embodiment.
Figure 2:
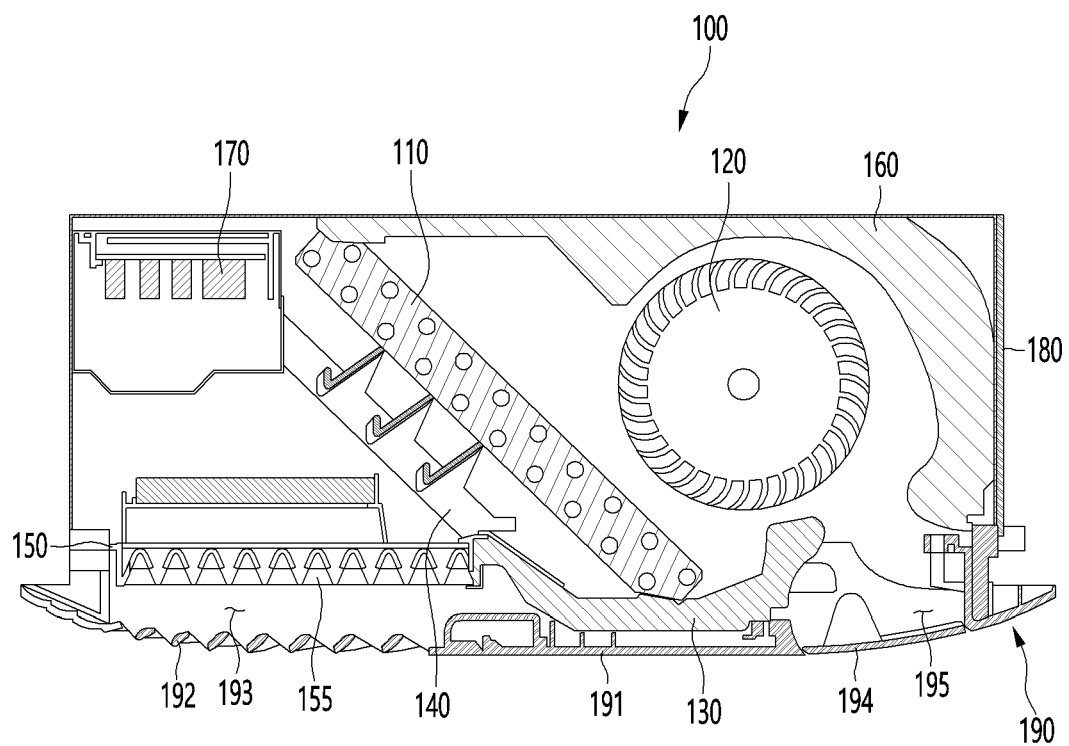
FIG. 2 is a cross-sectional view illustrating an inner configuration of the indoor unit according to an embodiment.

FIG. 1 is a front view illustrating an indoor unit of an air conditioner according to an embodiment, and FIG. 2 is a cross-sectional view illustrating an inner configuration of the indoor unit according to an embodiment. Referring to FIGS. 1 and 2, an air conditioner according to an embodiment may be a device that maintains indoor air in a suitable state depending on the use and purpose, such as in a desired range of temperature and/or air moisture levels. The air conditioner may include, for example, an indoor unit 100 disposed in an indoor space and an outdoor unit 200 (see FIG. 5) disposed in an outdoor space. The indoor unit 100 and the outdoor unit 200 may be fluidly connected to each other (e.g., via one or more refrigerant pipes) to exchange a fluid, and in one example, the fluid may include a refrigerant.

The outdoor unit 200 may be disposed outside a building, and the indoor unit 100 may be disposed inside the building. In one embodiment discussed on the following discussion, the indoor unit 100 will be described as an example of a ceiling-type indoor unit installed on a ceiling inside the building. However, the present disclosure is not limited thereto, and the indoor unit 100 may be, for example, a stand-type indoor unit erected on an indoor floor, a wall mount-type indoor unit installed on a wall, or a window-type indoor unit installed on a window.

The indoor unit 100 may include a case 180 and a front panel 190. The case 180 may be embedded in an inner space of the ceiling or other interior surface, and the front panel 190 may be coupled to a lower portion of the case 180. In addition, the front panel 190 may be disposed at approximately a height of the ceiling or other interior surface and exposed to the interior space receiving the conditioned air.

A number of components may be installed inside the case 180. The case 180 may define a predetermined inner space, and one surface thereof may be opened. For example, the case 180 may have a rectangular box shape. The plurality of components inside the case 180 may include an indoor heat exchanger 110 that performs a heat-exchange with air suctioned into the case 180. The indoor heat exchanger 110 may extend to be inclined with respect to the front panel 190.

The plurality of components in indoor unit 100 may further include an indoor fan 120 that is driven to suction and discharge indoor air. The indoor fan 120 may be elongated along a longitudinal direction of the indoor unit 100. For example, the indoor fan 120 may include a tangential fan.

The indoor fan 120 may be disposed at a discharge side of the indoor heat exchanger 110 based on the air flow direction, and the indoor heat exchanger 110 may be disposed at a suction side of the indoor fan 120 based on an air flow direction. Thus, the air suctioned in through a suction portion 193 of the front panel 190 may be heat-exchanged through the indoor heat exchanger 110, and the heat-exchanged air may then pass through the indoor fan 120 and then may be discharged through a discharge portion 195 of the front panel 190. Here, based on the indoor heat exchanger 110, an air flow path from the suction portion 193 of the front panel 190 to the heat exchanger 110 may be defined as a "suction flow path", and an air flow path from the indoor heat exchanger 110 to the discharge portion 195 of the front panel 190 may be defined as a "discharge flow path".

The plurality of components in indoor unit 100 may further include a main drain pan 130 supporting a lower portion of the indoor heat exchanger 110 and collecting condensed water generated in the indoor heat exchanger 110. The main drain pan 130 may be installed and fixed inside the front panel 190.

The plurality of components in indoor unit 100 may further include a sub-drain pan 140 to prevent the condensed water from falling directly downward from a middle portion of the indoor heat exchanger 110. The sub-drain pan 140 may be disposed between the indoor heat exchanger 110 and the main drain pan 130 to assist water collection into the main drain pan 130.

The plurality of components in indoor unit 100 may further include a filter 155 disposed inside the suction portion 193 of the front panel 190 to filter foreign substances in the air. The filter 155 may be disposed in the suction flow path toward the heat exchanger 110. For example, based on an air flow direction, the filter 155 may be disposed on an outlet side of the suction portion 193.

The plurality of components in indoor unit 100 may further include a filter mounting portion 150 supporting the filter 155. The filter mounting portion 150 may be provided in a frame or grill shape to allow the filter 155 to be selectively mounted and detached, such as to allow the filter 155 to be replaced or cleaned by a user. The filter mounting portion 150 may be supported by the front panel 190 and the main drain pan 130.

The filter mounting portion 150 may include a filter support on which the filter 155 is substantially seated, and a filter bracket in which the filter support is coupled to support the filter support. The filter support may be provided in a rectangular frame or grill shape with an empty inside space. The filter support may be elongated in a longitudinal direction of the front panel 190, and the filter 155 may be placed inside the filter support. The filter bracket may be provided in a rectangular frame or grill shape corresponding to the shape of the filter support so that the filter support may be mounted inside the filter bracket, and the filter bracket may have an area greater than that of the filter support so that the filter support may be accommodated inside the filter bracket.

The plurality of components in indoor unit 100 may further include a rear guide 160 guiding a flow of the indoor air passing through the indoor heat exchanger 110. The rear guide 160 may be disposed in or otherwise define a portion of the discharge flow path. The rear guide 160 may guide the indoor air passing through the indoor heat exchanger 110 so as to smoothly flow to the discharge portion 195 of the front panel 190. For example, the rear guide 160 may be in close contact with an inner surface of the case 180 and may be elongated in a horizontal direction (e.g., in a direction corresponding to a left-to-right extension direction of the front panel 190).

The plurality of components in indoor unit 100 may further include a control box 170 that controls an operation of the air conditioner. The control box 170 may include a board having a substrate and a plurality of electric components coupled to the substrate to function as a controller. The control box 170 may be disposed on an inner edge portion of the case 180, and the control box 170 may be disposed in the suction flow path. For example, the control box 170 may be cooled by air following along the suction flow path.

The front panel 190 may be mounted on an end of the case 180 (e.g., a lower end in a ceiling mounted indoor unit) and may have a substantially rectangular shape when viewed from the outside. The front panel 190 may be provided to protrude more outward from a ceiling or other a mounting surface than a lower end of the case 180 so that a circumferential portion is in contact with a bottom surface of the ceiling.

In one example, the front panel 190 may include a panel body 191 forming the suction portion 193 through which air is suctioned in and the discharge portion 195 through which air is discharged. The suction portion 193 may be provided to be elongated in the horizontal direction at a front portion of the front panel 190, and the discharge portion 195 may be provided to be elongated in the horizontal direction at the rear portion of the front panel 190.

In addition, the front panel 190 may further include a suction grill 192 detachably coupled to the suction portion 193. The suction grill 192 may include a plurality of grill portions for preventing an introduction of relatively large foreign substances and contaminants through the suction portion 193.

The indoor unit 100 may further include a discharge vane 194 movably provided at one side of the discharge portion 195 to control an amount of air discharged through the discharge portion 195 or a flow direction of the air. For example, the discharge vane 194 may be provided to move rotatably forward and backward about hinge shafts provided at both ends of the discharge vane 194.

Figure 3:
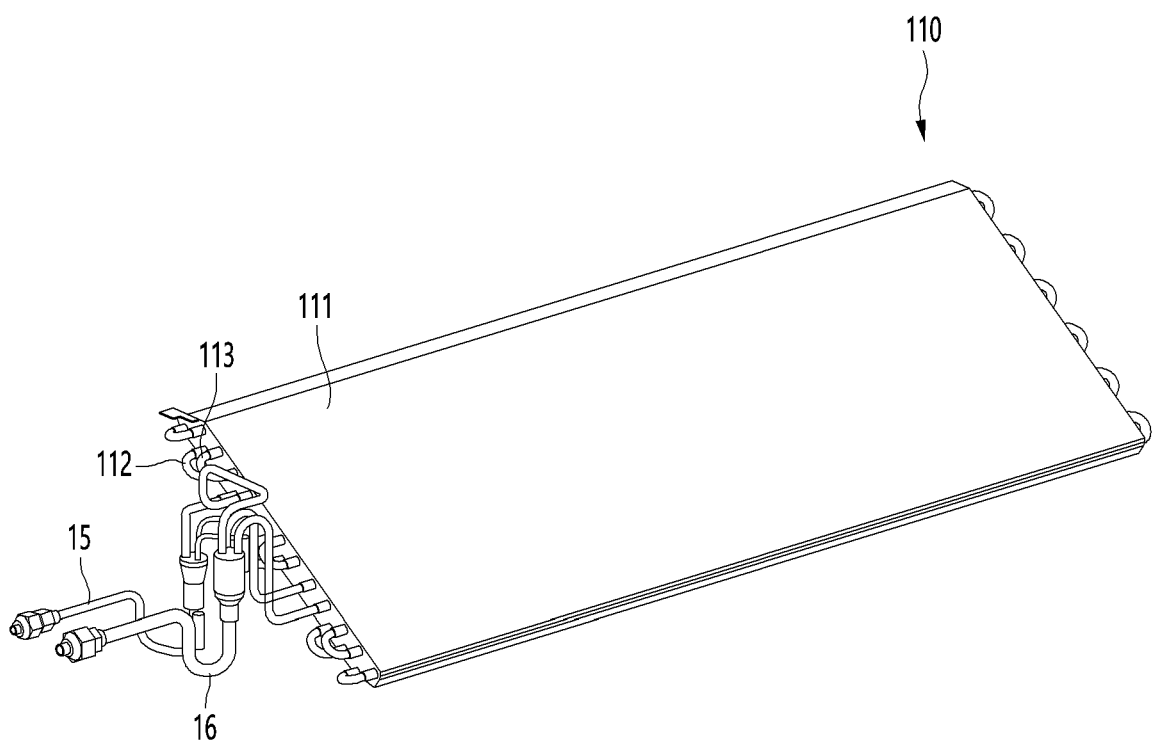
FIG. 3 is a perspective view illustrating an indoor heat exchanger according to an embodiment.
Figure 4:
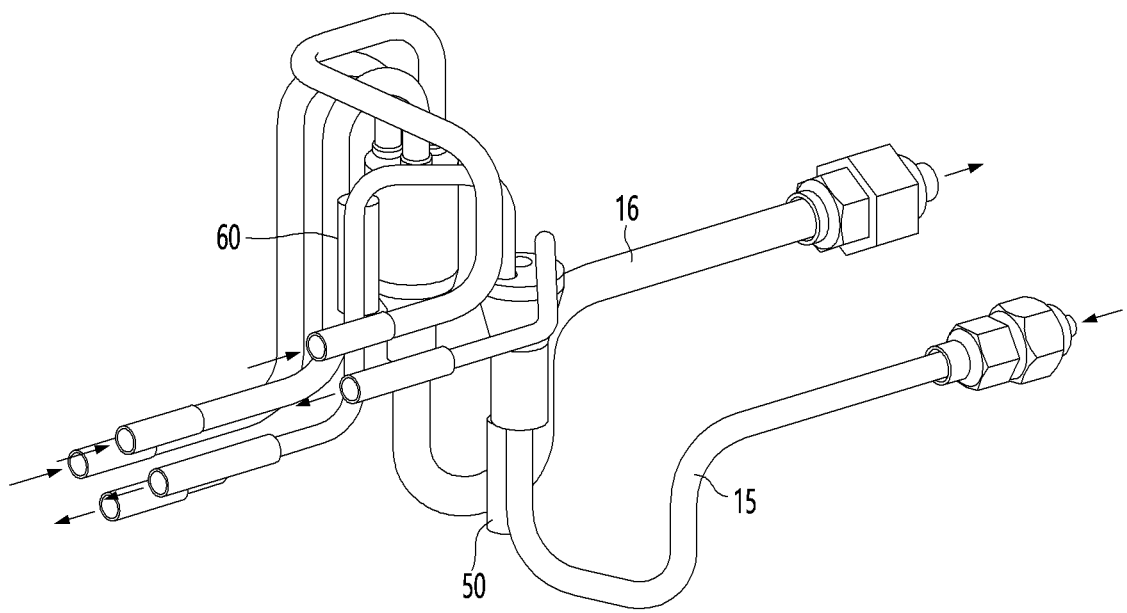
FIG. 4 is a perspective view illustrating a tube connected to the indoor heat exchanger according to an embodiment.

FIG. 3 is a perspective view illustrating the indoor heat exchanger 110 according to an embodiment, and FIG. 4 is a perspective view illustrating a tube connected to the indoor heat exchanger 110 according to an embodiment. Referring to FIGS. 3 and 4, the indoor heat exchanger 110 may include, for example, a housing 111 defining an outer appearance thereof, heat exchange fins (not shown) disposed inside the housing to transfer heat, and heat exchange tubs 112 and 113 passing through the heat exchange fin and defining a refrigerant flow path.

The housing 111 may define a predetermined space therein, and the heat exchange fins and the heat exchange tubes 112 and 113 may be accommodated in the predetermined space defined by the housing 111. For example, the housing 111 may have a rectangular or square box shape.

A plurality of heat exchange fins may be accommodated inside the housing 111 to correspond to the shape of the housing 111. The plurality of heat exchange fins may be disposed substantially parallel to each other in the longitudinal direction of the housing 111. For example, the heat exchange fin may be provided in a rectangular plate shape. A plurality of heat exchange fins may be stacked and disposed in the longitudinal direction inside the housing 111.

The heat exchange tubes 112 and 113 may pass between the plurality of heat exchange fins. Each of the heat exchange tubes 112 and 113 may be provided in a tubular shape to form a series of flow paths through which a refrigerant flows. Each of the heat exchange tubes 112 and 113 may have, for example, a circular tube shape, and a cross-section thereof may be uniform. However, the heat exchange tubes 112 and 113 may have a different, non-circular cross-section shape, and the shapes and sizes of the heat exchange tubes 112 and 113 may vary within the housing 111.

The heat exchange tubes 112 and 113 may be entirely provided in a straight tube shape, and at least a portion thereof may be provided in a U-shaped tube shape. The heat exchange tubes 112 and 113 may be made of a metallic material having excellent thermal conductivity.

A plurality of insertion holes into which the heat exchange tubes 112 and 113 are inserted may be defined in the heat exchange fin(s). Thus, the plurality of heat exchange tubes 112 and 113 may be arranged according to each row inside the heat exchange fin(s). For example, the heat exchange fin may include a front row and a rear row in which the heat exchange tubes 112 and 113 are disposed. For example, the number of rows of heat exchange tubes 112 and 113 inserted into the heat exchange fins may be provided in two rows, and the heat exchange tubes 112 and 113 may be inserted into two rows in each of the front row and the rear row.

The heat exchange tubes 112 and 113 may include a first heat exchange tube 112 disposed in the front row of the heat exchange fin and a second heat exchange tube 113 disposed in the rear row of the heat exchange fin. The first heat exchange tube 112 may be disposed at a front side inside the housing 111, and the second heat exchange tube 113 may be disposed a the rear side inside the housing 111. Here, the first heat exchange tube 112 may be disposed to face the suction portion 193 inside the case 180, and the second heat exchange tube 113 may be disposed to face the indoor fan 120 inside the case 180

The indoor heat exchanger 110 may be connected to a first refrigerant flow tube 15 through which the refrigerant is introduced and a second refrigerant flow tube 16 through which the refrigerant is discharged. The first refrigerant flow tube 15 may be referred to as a "third connection tube", and the second refrigerant flow tube 16 may be referred to as a "fourth connection tube".

The first refrigerant flow tube 15 may be coupled to a refrigerant suction side of the indoor heat exchanger 110, and the second refrigerant flow tube 16 may be coupled to a refrigerant discharge side of the indoor heat exchanger 110. Thus, the refrigerant may flow into the indoor heat exchanger 110 through the first refrigerant flow tube 15 and may be discharged to the outside of the indoor heat exchanger 110 through the second refrigerant flow tube 16.

A first tube temperature sensor 50 for detecting a temperature of the tube may be provided at one side of the first refrigerant flow tube 15, and a second tube temperature sensor 60 for detecting a temperature of the tube may be provided at one side of the second refrigerant flow tube 16. Therefore, the temperature of the refrigerant introduced into the indoor heat exchanger 110 may be detected by the first tube temperature sensor 50, and the temperature of the refrigerant discharged from the indoor heat exchanger 110 may be detected by the second tube temperature sensor 60.

Figure 5:
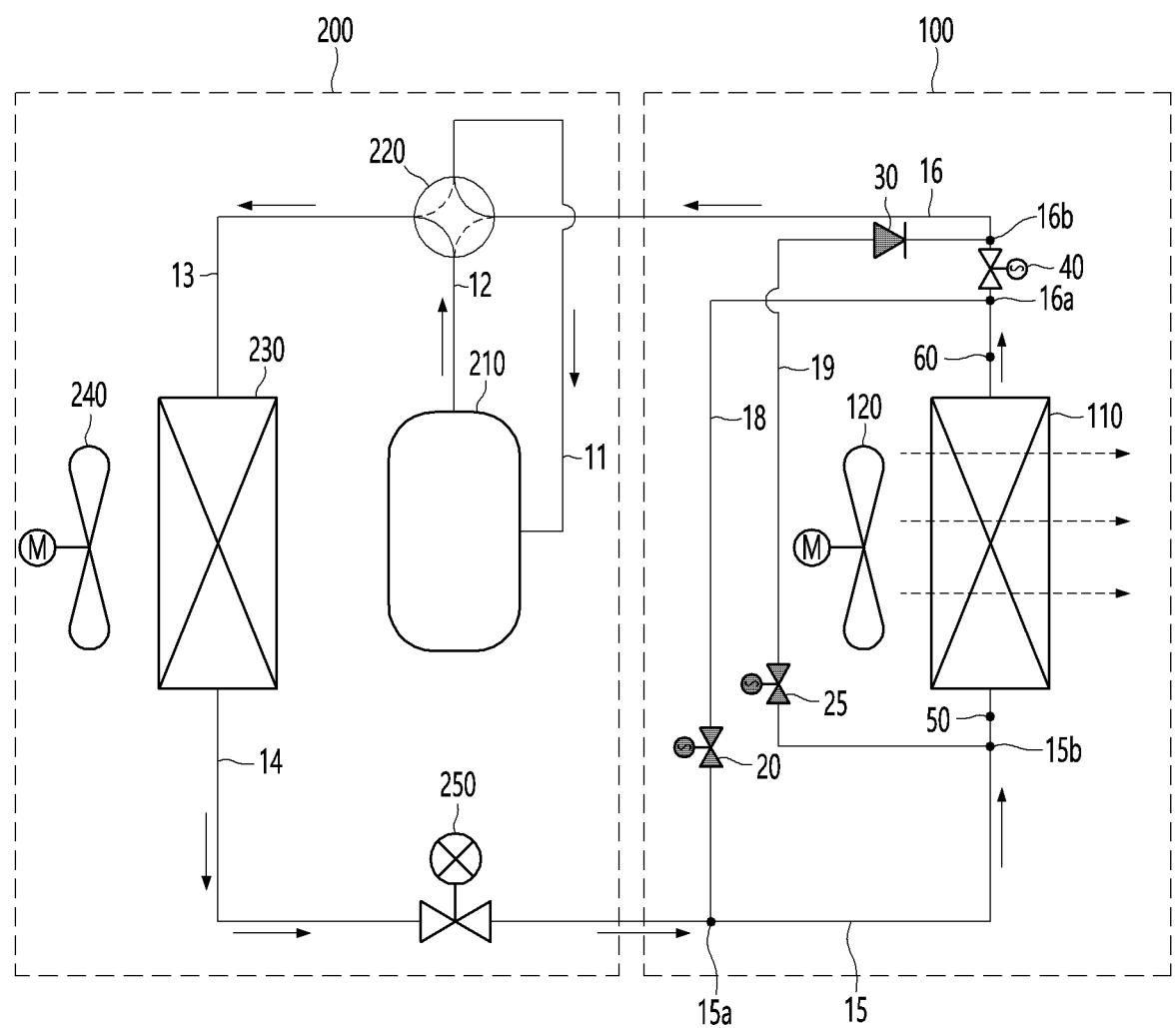
FIG. 5 is a tube diagram for explaining a flow of a refrigerant in a cooling mode of the air conditioner according to an embodiment.

FIG. 5 is a tube diagram for explaining a flow of the refrigerant in a cooling mode of the air conditioner according to an embodiment. Hereinafter, an overall cycle configuration of the air conditioner will be described with reference to FIG. 5.

The air conditioner includes an outdoor unit 200, an indoor unit 100, and at least one refrigerant tube connecting the outdoor unit 200 to the indoor unit 100. The outdoor unit 200 may include, for example, a compressor 210, a valve device 220, an outdoor heat exchanger 230, an outdoor fan 240, and an expansion valve 250. The indoor unit 100 may include an indoor heat exchanger 110, an indoor fan 120, a first bypass valve 20, a second bypass valve 25, a check valve 30, and a flow switching valve 40. It should be appreciated, however, that the indoor unit 100 and the outdoor unit 200 may omit one or more of these components and/or may include additional components. Each of the components included in the indoor unit 100 and the outdoor unit 200 may be connected by a refrigerant tube, and the refrigerant may circulate through the refrigerant tube to perform compression, condensation, expansion, and evaporation.

The compressor 210 may compress the refrigerant having a gaseous state at a high-temperature high-pressure. The compressor 21 may include, for example, a constant speed compressor that rotates at a constant speed to compress the refrigerant to a predetermined capacity and/or an inverter compressor that is variable in rotational speed according to a load to adjust a compression capacity. It should be appreciated that other types of devices may be used for compressor 210.

The valve device 220 may be disposed at an outlet side of the compressor 210. The valve device 220 may function to transfer the refrigerant compressed by the compressor 210 selectively to the outdoor heat exchanger 230 or the indoor heat exchanger 110. For example, the valve device 220 may include a four-way valve having four ports for inflow and outflow of the refrigerant.

The outdoor heat exchanger 230 may be provided to enable a heat-exchange between outside air and the refrigerant. The outdoor heat exchanger 230 may function as a condenser and/or an evaporator according to an operation mode. The outdoor heat exchanger 230 may be disposed at the outlet side of the valve device 220, such as to receive hot, compressed refrigerant from the compressor 210.

The outdoor fan 240 may be disposed at one side of the outdoor heat exchanger 230 to blow air toward the outdoor heat exchanger 230. When the rotational speed of the outdoor fan 240 increases, a volume of the air supplied to the outdoor heat exchanger 230 may increase, and thus, a heat exchange rate of the outdoor heat exchanger 230 may increase.

The expansion valve (or expansion device) 250 may serves to decompress the refrigerant flowing through the refrigerant tube. The expansion valve 250 may be disposed at a point between the outdoor heat exchanger 230 and the indoor heat exchanger 110. The expansion valve 250 may expand the condensed refrigerant introduced into the indoor heat exchanger 110 from the outdoor heat exchanger 230 or expand the condensed refrigerant introduced into the outdoor heat exchanger 230 from the indoor heat exchanger 110.

As previously described, the indoor heat exchanger 110 may function to enable a heat-exchange between the interior air and the refrigerant. The indoor heat exchanger 110 may function as the evaporator or the condenser according to an operation mode.

As previously described, the indoor fan 120 may be disposed at one side of the indoor heat exchanger 110 to blow the air toward the indoor heat exchanger 110. When the rotational speed of the indoor fan 110 increases, a volume of the air supplied to the indoor heat exchanger 110 may increase, and thus, the heat exchange rate of the indoor heat exchanger 110 may increase.

According to the operation mode of the air conditioner, one of the outdoor heat exchanger 230 and the indoor heat exchanger 110 may function as the condenser, and the other may function as the evaporator. For example, when the air conditioner performs a cooling operation (cooling mode) to cool the interior space adjacent to the indoor unit 100, the refrigerant compressed by the compressor 210 may be introduced into the outdoor heat exchanger 230 and then be condensed. The condensed refrigerant may be introduced into the indoor heat exchanger 110 and then be evaporated to enable a cooling heat exchange with the inside air. That is, in the cooling mode of the air conditioner, the outdoor heat exchanger 230 may function as the "condenser" to release heat, and the indoor heat exchanger 110 may function as the "evaporator" to absorb heat.

As another example, when the air conditioner performs a heating operation (heating mode), the refrigerant compressed by the compressor 210 may be introduced into the indoor heat exchanger 110 and then be condensed through a heat exchange to warm the inside air. The condensed refrigerant may be introduced into the outdoor heat exchanger 230 and then be evaporated to absorb heat from outside air. That is, in the heating mode of the air conditioner, the outdoor heat exchanger 230 may function as the "evaporator" to absorb heat, and the indoor heat exchanger 110 may function as the "condenser" to release heat.

As another example, when the air conditioner performs a freezing operation (freezing mode), the refrigerant compressed in the compressor 210 may be introduced into the outdoor heat exchanger 230 and then be condensed. The condensed refrigerant may be introduced into the indoor heat exchanger 110 and then be evaporated. That is, in the freezing mode of the air conditioner, the outdoor heat exchanger 230 may function as the "condenser", and the indoor heat exchanger 110 may function as the "evaporator".

The refrigerant tube may include a suction tube 11 for suctioning the refrigerant into the compressor 210. The suction tube 11 may connect the compressor 210 to the valve device 220. For example, the suction tube 11 may extend from a suction side of the compressor 210 to a port (e.g., a fourth tube) of the valve device 220.

The refrigerant tube further may include a discharge tube 12 that guides the refrigerant compressed in the compressor 210 to the valve device 220. The discharge tube 12 may connect the compressor 210 to the valve device 220. The discharge tube 12 may extend from a discharge side of the compressor 210 to a port (e.g., a first port) of the valve device 220.

The refrigerant tube further may include a first connection tube 13 extending from a port (e.g., a second port) of the valve device 220 to a suction side of the outdoor heat exchanger 230. The refrigerant tube further may include a second connection tube 14 extending from the discharge side of the outdoor heat exchanger 230 to the expansion valve 250.

The refrigerant tube further may include a third connection tube 15 extending from the expansion valve 250 to the suction side of the indoor heat exchanger 110. The refrigerant tube further may include a fourth connection tube 16 extending from the discharge side of the indoor heat exchanger 110 to the third port of the valve device 220.

In one example, the refrigerant tube may further include a first bypass tube 18 branched at a first branch point 15a of the third connection tube 15 and then joined to a first joining point 16a of the fourth connection tube 16. The first bypass tube 18 serves to allow the refrigerant to bypass to the outlet side of the indoor heat exchanger 110 in the freezing mode of the air conditioner. The first bypass tube 18 may switch the flow direction of the refrigerant introduced into the indoor heat exchanger 110.

The first bypass valve 20 may be installed in the first bypass tube 18. The first bypass valve 20 may function to control the flow of the refrigerant in the first bypass tube 18 through an opening and closing operation. For example, the first bypass valve 20 may include a solenoid valve. When the first bypass valve 20 is opened, the refrigerant flowing through the first bypass tube 18 may be introduced into the outlet side of the indoor heat exchanger 110 and then be discharged to the inlet side of the indoor heat exchanger 110. That is, the flow direction of the refrigerant in the indoor heat exchanger 110 may be reversed.

In addition, the refrigerant tube further may include a second bypass tube 19 branched at a second branch point 15b of the third connection tube 15 and then joined to a second joining point 16b of the fourth connection tube 16. The second bypass tube 19 serves to enable the refrigerant discharged from the inlet side of the indoor heat exchanger 110 to bypass to the discharge side of the indoor heat exchanger 110 in the freezing mode of the air conditioner.

The second bypass valve 25 may be installed in the second bypass tube 19. The second bypass valve 25 functions to control the flow of the second bypass tube 19 through an opening and closing operation. For example, the second bypass valve 25 may include a solenoid valve. When the second bypass valve 25 is opened, the refrigerant flowing through the second bypass tube 19 may be introduced into the outlet side of the flow switching valve 40 and then flow into the valve device 220.

In addition, the check valve 30 may be installed in the second bypass tube 19. The check valve 30 functions to restrict the flow of refrigerant to only one direction. For example, in the state in which the second bypass valve 25 is opened, the refrigerant in the second bypass tube 19 may flow in only one direction. Thus, the refrigerant flowing through the second bypass tube 19 may flow from the third connection tube 15 to the fourth connection tube 16 by the check valve 30.

The first branch point 15a may be disposed between the expansion valve 250 and the indoor heat exchanger 110. The second branch point 15b may be disposed between the first branch point 15a and the indoor heat exchanger 110.

The first joining point 16a may be disposed between the indoor heat exchanger 110 and the flow switching valve 40. The second joining point 16b may be disposed between the flow switching valve 40 and the valve device 220.

The flow switching valve 40 may be installed in the fourth connection tube 16. The flow switching valve 40 may switch the flow direction of the refrigerant through an opening and closing operation. The flow switching valve 40 may remain in the opened state in normal times and may be closed to switch the flow direction of the refrigerant in the freezing mode of the air conditioner. For example, the flow switching valve 40 may include a solenoid valve. The flow switching valve 40 may be disposed between the indoor heat exchanger 110 and the valve device 220. For example, the flow switching valve 40 may be disposed between the first joining point 16a and the second joining point 16b.

As previously described, the indoor unit 100 may further include the first tube temperature sensor 50 installed at a portion of the third connection tube 15, which corresponds to the inlet side of the indoor heat exchanger 110, and the second tube temperature sensor 60 installed at a portion of the fourth connection tube 16, which corresponds to the outlet side of the indoor heat exchanger 110.

Referring to FIG. 5, when the air conditioner operates in the cooling mode M1, the valve device 220 may be switched into a first valve mode so that the outdoor heat exchanger 230 functions as the condenser, and the indoor heat exchanger 110 functions as the evaporator. In the cooling mode M1, the first bypass valve 20 may be closed, and the second bypass valve 30 may be closed. In addition, the flow switching valve 40 may be opened.

In detail, the air conditioner (e.g., control box 170) may control the valve device 220 to fluidly connect the first port and the second port of the valve device 220 to each other and also fluidly connect the third port and the fourth port to each other. In this configuration of the valve device 220, the refrigerant compressed by the compressor 210 may be introduced into the first port of the valve device 220 through the discharge tube 12 and then be discharged through the second port. The refrigerant discharged from the valve device 220 may be introduced into the outdoor heat exchanger 230 along the first connection tube 13 and then be condensed.

The refrigerant condensed in the outdoor heat exchanger 230 may be introduced into the expansion valve 250 along the second connection tube 14 and then is decompressed. The refrigerant passing through the expansion valve 250 may be introduced into the indoor heat exchanger 110 along the third connection tube 15 and then be evaporated. The refrigerant discharged from the indoor heat exchanger 110 may be introduced into the third port of the valve device 220 along the fourth connection tube 16 and then may be discharged through the fourth port. The refrigerant discharged from the valve device 220 may be suctioned into the compressor 210 through the suction tube 11. The circulation of the refrigerant may be repeatedly performed.

Figure 6:
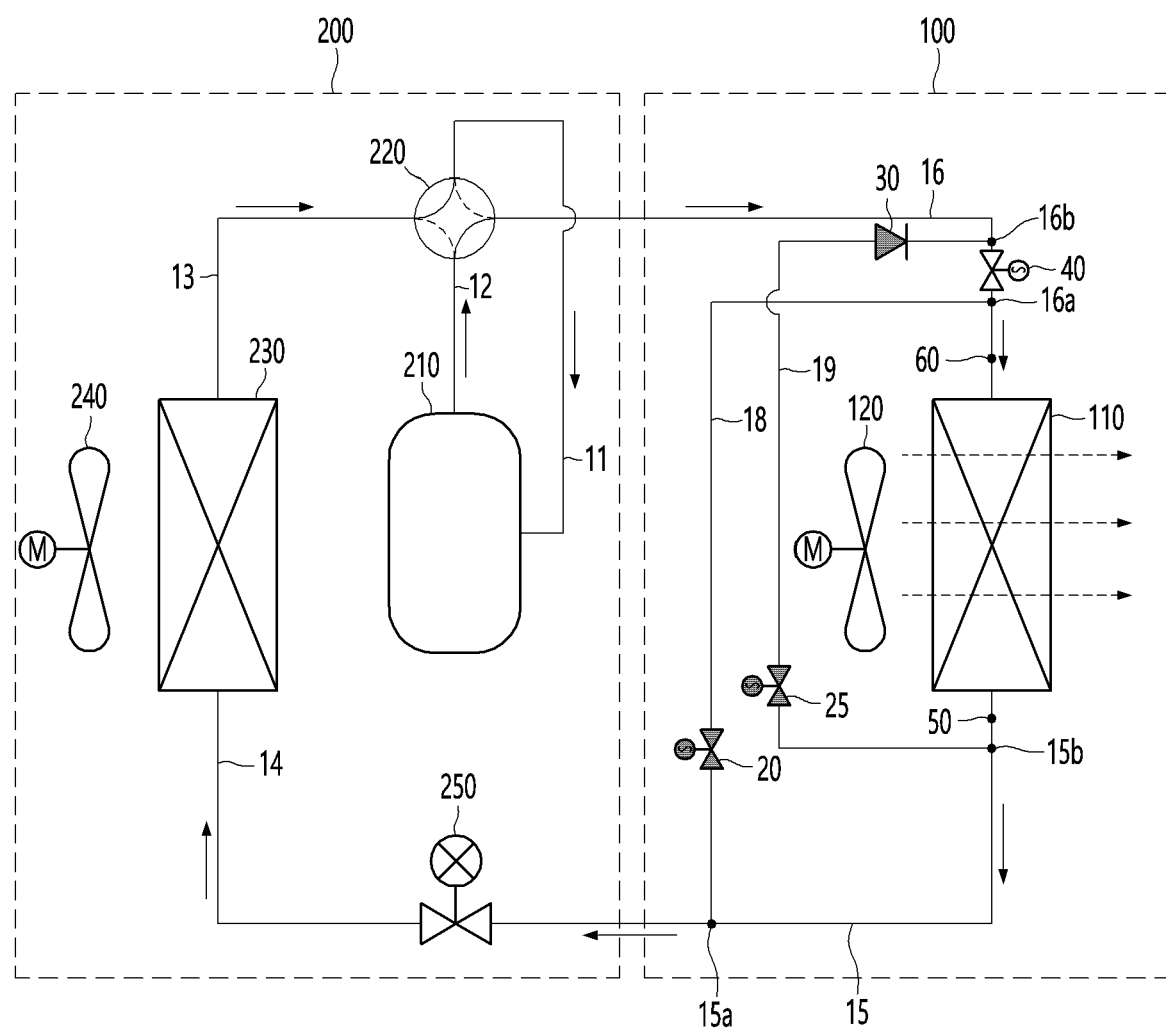
FIG. 6 is a tube diagram for explaining a flow of the refrigerant in a heating mode of the air conditioner according to an embodiment.

FIG. 6 is a tube diagram for explaining a flow of the refrigerant in the heating mode M2 of the air conditioner according to an embodiment. Referring to FIG. 6, when the air conditioner operates in the heating mode M2, the valve device 220 may be switched into the second valve mode so that the outdoor heat exchanger 230 functions as the evaporator, and the indoor heat exchanger 110 functions as the condenser.

In the heating mode M2, the first bypass valve 20 may be closed, and the second bypass valve 30 may be closed. In addition, the flow switching valve 40 may be opened. For example, the air conditioner may control the valve device 220 to fluidly connect the first port and the third port of the valve device 220 to each other and also fluidly connect the second port and the fourth port to each other.

The refrigerant compressed by the compressor 210 may be introduced into the first port of the valve device 220 through the discharge tube 12 and then be discharged through the third port of the valve device 220. The refrigerant discharged from the valve device 220 may be introduced into the indoor heat exchanger 110 along the fourth connection tube 16 and then be condensed.

The refrigerant condensed in the indoor heat exchanger 110 may be introduced into the expansion valve 250 along the third connection tube 15 and then may be decompressed. The refrigerant passing through the expansion valve 250 may be introduced into the outdoor heat exchanger 230 along the second connection tube 14 and is then evaporated.

The refrigerant discharged from the outdoor heat exchanger 230 may be introduced into the second port of the valve device 220 along the first connection tube 13 and may be discharged through the fourth port. The refrigerant discharged from the valve device 220 may be suctioned into the compressor 210 through the suction tube 11. The circulation of the refrigerant may be repeatedly performed.

Figure 7:
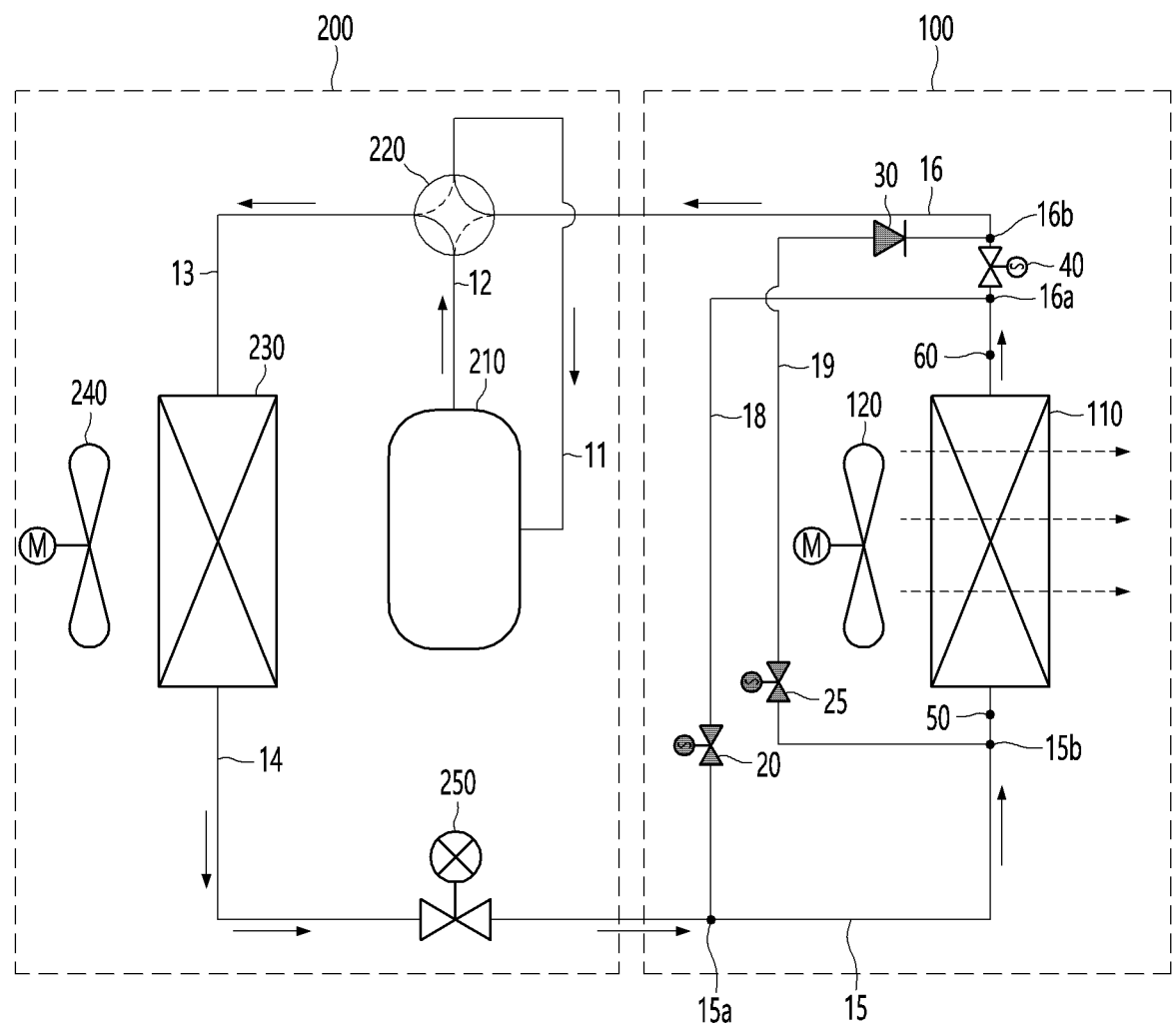
FIG. 7 is a tube diagram for explaining a flow of the refrigerant in a first freezing mode of the air conditioner according to an embodiment.
Figure 8:
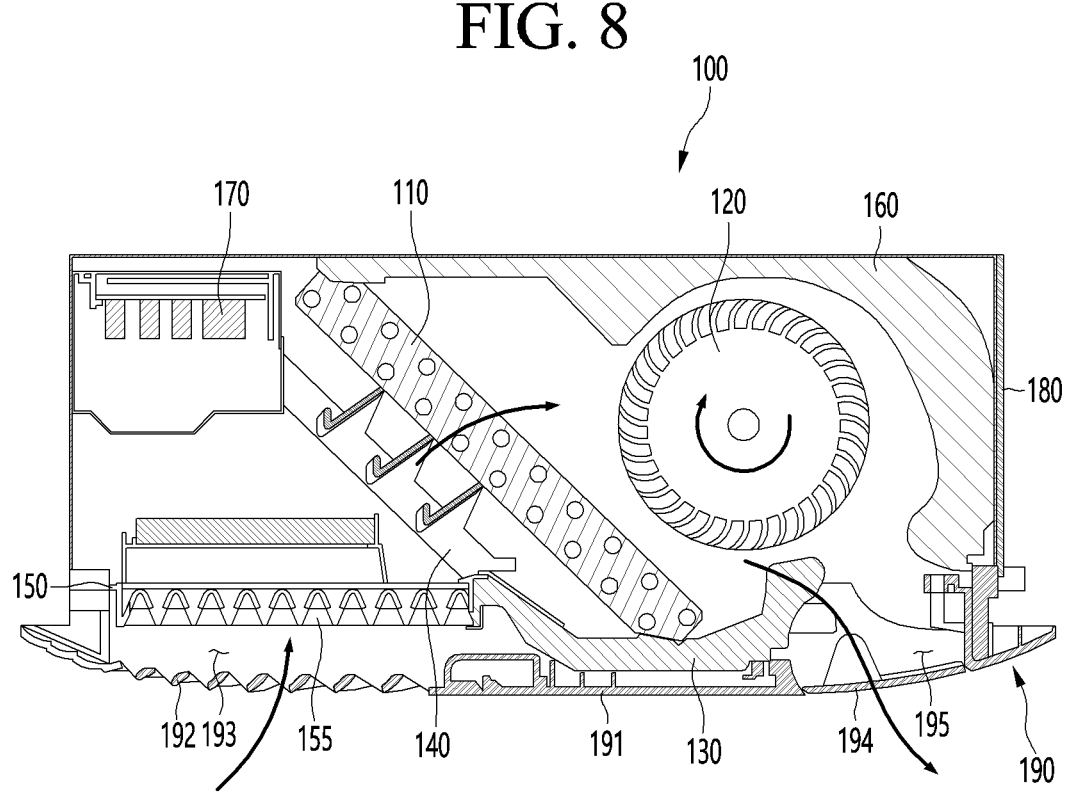
FIG. 8 is a cross-sectional view illustrating an air flow path of the indoor unit in the first freezing mode.
Figure 9:
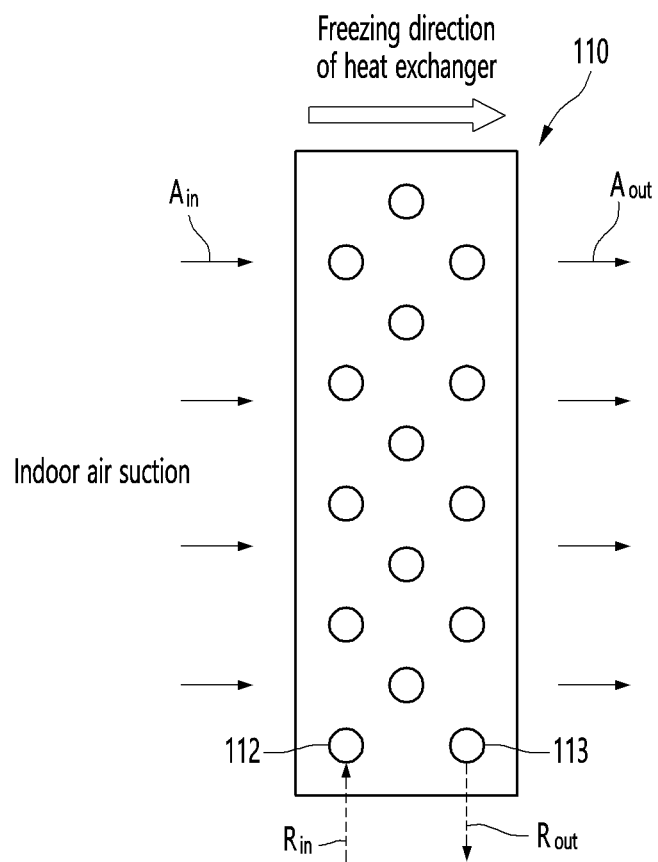
FIG. 9 is a view illustrating an air flow direction and a refrigerant flow direction of the indoor heat exchanger in the first freezing mode.

FIG. 7 is a tube diagram for explaining a flow of the refrigerant in the first freezing mode M3 of the air conditioner according to an embodiment, FIG. 8 is a cross-sectional view illustrating an air flow path of the indoor unit in the first freezing mode M3, and FIG. 9 is a view illustrating an air flow direction and a refrigerant flow direction of the indoor heat exchanger in the first freezing mode M3. More specifically, referring to FIGS. 7 to 9, the air conditioner according to an embodiment may perform a freeze-cleaning operation to remove foreign substances such as dust adsorbed to the indoor heat exchanger.

The freeze-cleaning operation may refer to an operation of removing foreign substances together while forming frost on a surface of the indoor heat exchanger and performing a defrosting operation of removing the frost on the surface of the indoor heat exchanger. The freeze-cleaning operation may be broadly classified into a condensing operation, a freezing operation, and a drying operation.

However, in the case of the freezing operation, since the indoor fan disposed at one side of the indoor heat exchanger typically rotates in only one direction, the one side (air inlet side) of the heat exchanger into which the air is introduced is well frozen, whereas the other side (air outlet side) of the heat exchanger through which the air is discharged is not frozen, and thus, the outer surfaces of the heat exchanger are not uniformly frozen. Therefore, the present disclosure proposes a technique for uniformly freezing the indoor heat exchanger by alternately freezing the air inlet side and the other, air outlet side of the indoor heat exchanger.

The freezing operation according to an embodiment may include a first freezing mode M3 and a second freezing mode M4. When the freezing operation is performed, the first freezing mode M3 and the second freezing mode M4 may be sequentially or alternately performed. In other examples, the first freezing mode M3 may be performed relatively more frequently than the second freezing mode M4 to allow relatively more frost to be formed on one side (air inlet side), or the first freezing mode M3 may be performed relatively less frequently than the second freezing mode M4 to allow relatively more frost to be formed on the other side (air outlet side).

In the first freezing mode M3, the indoor fan 120 may rotate in a forward direction (clockwise direction in FIG. 8), and thus, the indoor air may be introduced into the suction portion 193 of the front panel 190 to pass through the indoor heat exchanger 110 and then may be discharged to the discharge portion 195 of the front panel 190 through the indoor fan 120. The refrigerant condensed in the outdoor heat exchanger 230 may be introduced into the inlet side of the indoor heat exchanger 110 and discharged to the outlet side, and a portion (e.g., first heat exchange tube 112) corresponding to a front row (e.g. first row) of the heat exchange fin may be intensively frozen.

Referring to FIG. 7, when the air conditioner operates in the first freezing mode M3, the valve device 220 may be switched into the first valve mode so that the outdoor heat exchanger 230 functions as the condenser, and the indoor heat exchanger 110 functions as the evaporator.

In the first freezing mode M3, the first bypass valve 20 is closed, and the second bypass valve 30 is closed. In addition, the flow switching valve 40 is opened. For example, in the first freezing mode M3, the refrigerant may be circulated in the same cycle as in the cooling mode M1 described above. However, in the first freezing mode M3, a target evaporation temperature may operate lower than in the cooling mode M1, and a compressor frequency of the outdoor unit 200 may increase.

In this way, the air conditioner may control the valve device 220 to fluidly connect the first port and the second port of the valve device 220 to each other and also fluidly connect the third port and the fourth port to each other. Thus, the refrigerant compressed by the compressor 210 may be introduced into the first port of the valve device 220 through the discharge tube 12 and then be discharged through the second port. Likewise, the refrigerant discharged from the valve device 220 may be introduced into the outdoor heat exchanger 230 along the first connection tube 13 and then be condensed.

The refrigerant condensed in the outdoor heat exchanger 230 may be introduced into the expansion valve 250 along the second connection tube 14 and then is decompressed. The refrigerant passing through the expansion valve 250 may be introduced into the indoor heat exchanger 110 along the third connection tube 15 and then be evaporated.

The refrigerant discharged from the indoor heat exchanger 110 may be introduced into the third port of the valve device 220 along the fourth connection tube 16 and then may be discharged through the fourth port. The refrigerant discharged from the valve device 220 may be suctioned into the compressor 210 through the suction tube 11. The circulation of the refrigerant may be repeatedly performed.

Figure 10:
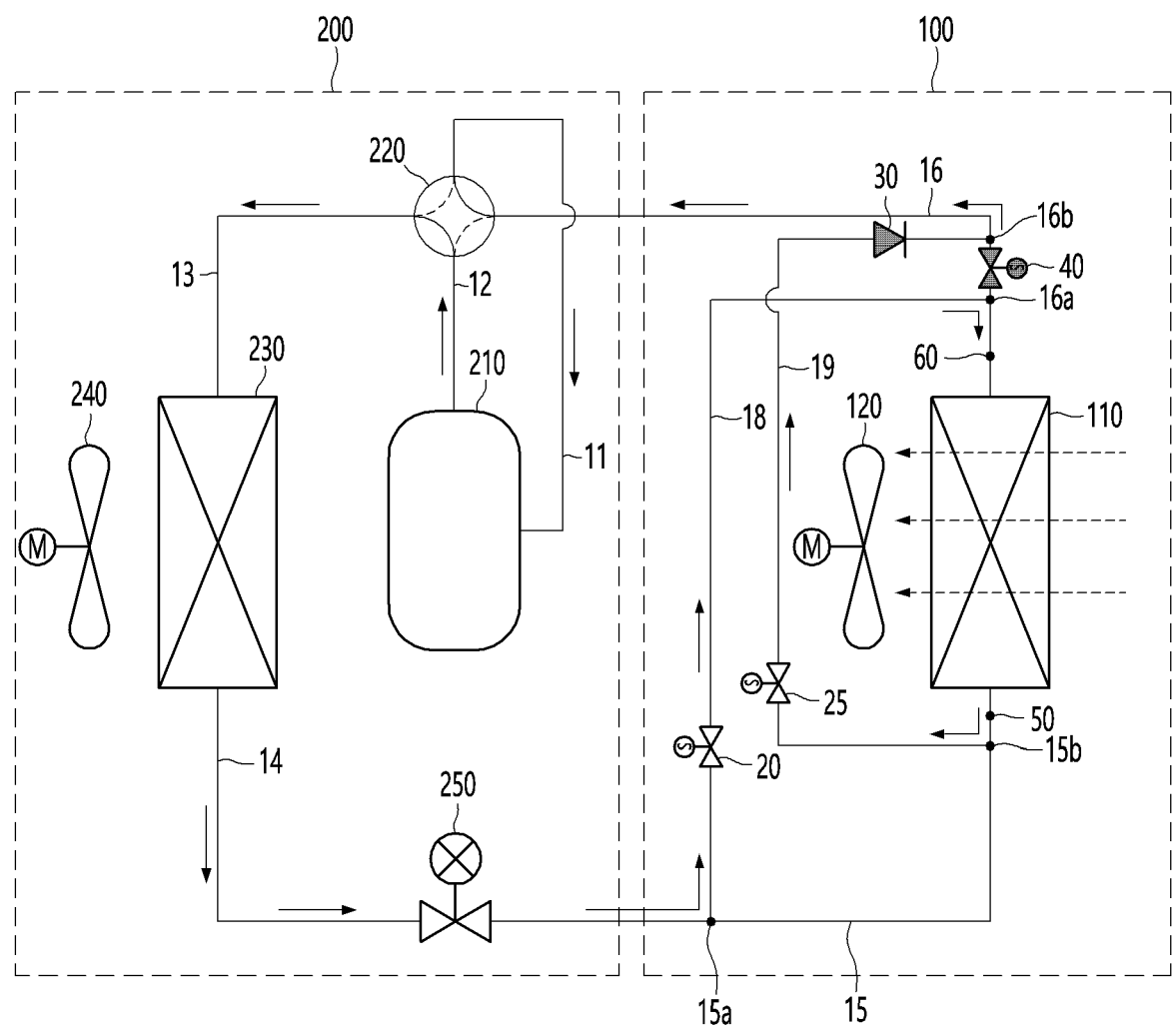
FIG. 10 is a tube diagram for explaining a flow of the refrigerant in a second freezing mode of the air conditioner according to an embodiment.
Figure 11:
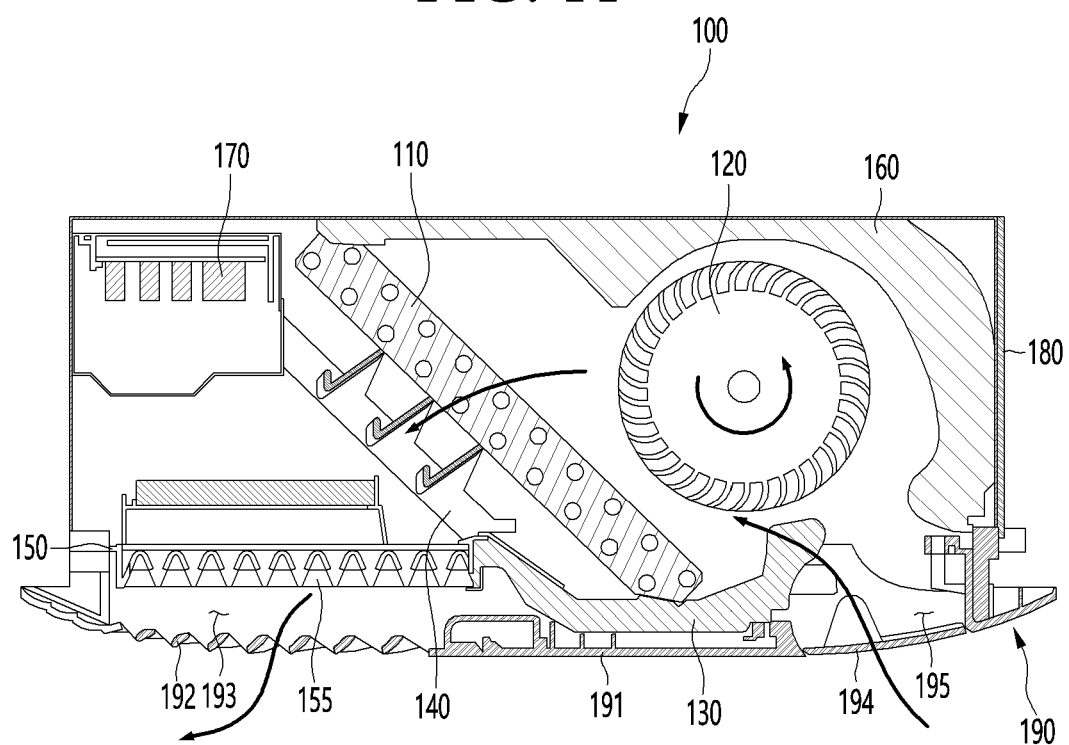
FIG. 11 is a cross-sectional view illustrating an air flow path of the indoor unit in the second freezing mode.
Figure 12:
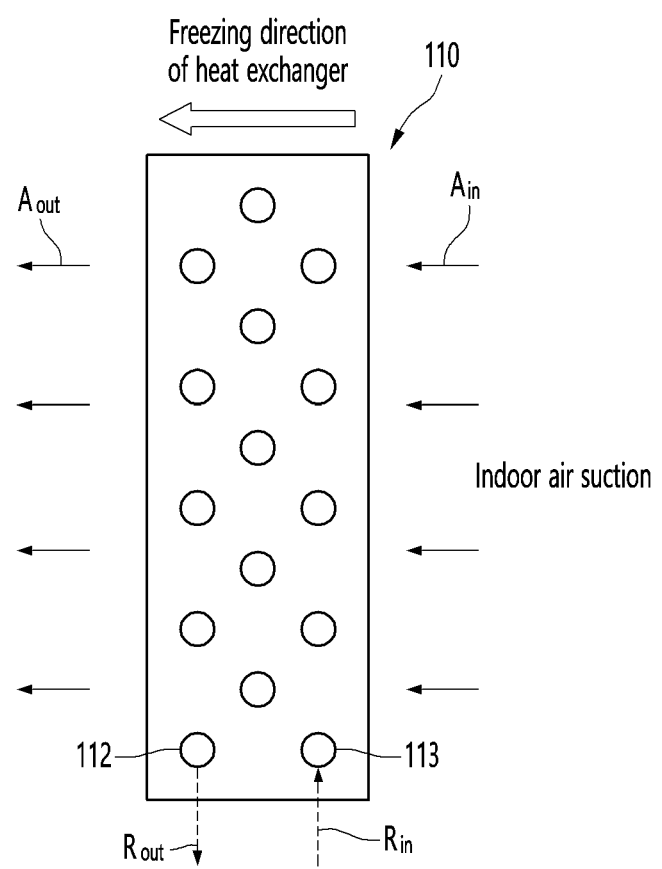
FIG. 12 is a view illustrating an air flow direction and a refrigerant flow direction of the indoor heat exchanger in the second freezing mode.

FIG. 10 is a tube diagram for explaining a flow of the refrigerant in the second freezing mode M4 of the air conditioner according to an embodiment, FIG. 11 is a cross-sectional view illustrating the air flow path of the indoor unit in the second freezing mode M4, and FIG. 12 is a view illustrating an air flow direction and a refrigerant flow direction of the indoor heat exchanger in the second freezing mode M4.

Referring to FIGS. 10 to 12, in the second freezing mode M4, the indoor fan 120 may rotate in a reverse direction (e.g., a counterclockwise direction) to suction indoor air through the indoor hear exchanger 110, and thus, the indoor air may be introduced into the discharge portion 195 of the front panel 190 to pass through the indoor heat exchanger 110 and then may be discharged to the suction portion 193 of the front panel 190 through the indoor heat exchanger 110. The refrigerant condensed in the outdoor heat exchanger 230 may be introduced into the outlet side of the indoor heat exchanger 110 and discharged to the inlet side, and a portion (e.g., second heat exchange tube 113) corresponding to a rear row (e.g. second row) of the heat exchange fin may be intensively frozen.

Referring to FIG. 10, when the air conditioner operates in the second freezing mode M4, the valve device 220 may be switched into the first valve mode so that the outdoor heat exchanger 230 functions as the condenser, and the indoor heat exchanger 110 functions as the evaporator. In the second freezing mode M4, the first bypass valve 20 may be opened, and the second bypass valve 30 may be opened. In addition, the flow switching valve 40 may be closed.

In the second freezing mode M4, a target evaporation temperature may operate lower than in the cooling mode M1, and a compressor frequency of the outdoor unit 200 may increase. For example, the air conditioner may control the valve device 220 to fluidly connect the first port and the second port of the valve device 220 to each other and also fluidly connect the third port and the fourth port to each other. The refrigerant compressed by the compressor 210 may be introduced into the first port of the valve device 220 through the discharge tube 12 and then be discharged through the second port. The refrigerant discharged from the valve device 220 may be introduced into the outdoor heat exchanger 230 along the first connection tube 13 and then be condensed.

The refrigerant condensed in the outdoor heat exchanger 230 may be introduced into the expansion valve 250 along the second connection tube (or connection tube) 14 and then is decompressed. The refrigerant passing through the expansion valve 250 may be introduced into the first bypass tube 18 from the first branch point 15a of the third connection tube 15. The refrigerant passing through the first bypass valve 20 may be introduced into the indoor heat exchanger 110 from the first joining point 16a of the fourth connection tube 16 and then be evaporated.

In this configuration, the refrigerant may be introduced into the outlet side of the indoor heat exchanger 110 and then discharged to the inlet side, and thus, the refrigerant flow direction in the indoor heat exchanger 110 may be reversed. The refrigerant discharged from the inlet side of the indoor heat exchanger 110 may be introduced into the second bypass tube 19 through the second branch point 15*b*.

The refrigerant flowing through the second bypass tube 19 may be introduced into the second joining point 16*b* through the check valve 30 and then may be introduced into the third port of the valve device 220 and may be discharged to the fourth port. The refrigerant discharged from the valve device 220 may be suctioned into the compressor 210 through the suction tube 11. The circulation of the refrigerant may be repeatedly performed.

According to the configuration according to an embodiment, since the first freezing mode M3 and the second freezing mode M4 may be performed sequentially or alternately, the one side (air inlet side) and the other side (air outlet side) of the indoor heat exchanger 110 may be substantially uniformly frozen. Therefore, there is an advantage in that foreign substances such as dust adhering to the indoor heat exchanger may be effectively frozen and then removed. Alternatively, the first freezing mode M3 and the second freezing mode M4 may be selectively performed of to achieve a desired level of freezing on each of the one side (air inlet side) and the other side (air outlet side) of the indoor heat exchanger 110, thus dust on both sides of the indoor heat exchanger 110 may be effectively frozen and removed in desired ratios.

Figure 13:
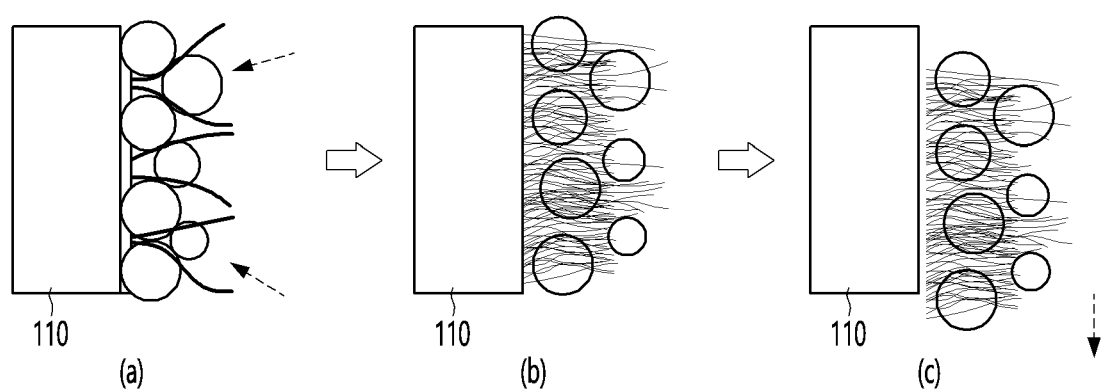
FIG. 13 is a schematic view illustrating a process of performing freeze-cleaning according to an embodiment.

FIG. 13 is a schematic view illustrating a process of performing the freeze-cleaning according to an embodiment. Referring to FIG. 13, the air conditioner may perform the freeze-cleaning operation to remove the foreign substances such as dust adhering to the indoor heat exchanger 110.

The freeze-cleaning operation refers to an operation of removing the foreign substances together while forming frost on the surface of the indoor heat exchanger and performing a defrosting operation of removing the frost on the surface of the indoor heat exchanger. The freeze-cleaning operation may be generally classified into a condensing operation, a freezing operation, and a drying operation.

As illustrated in (a) of FIG. 13, when the condensing operation is performed, moisture (e.g., condensed water) may be formed on a surface of the indoor heat exchanger 110. Then, the surface of the indoor heat exchanger 110 may be contaminated with the dust and the like together with the condensed water. In addition, as illustrated in (b) of FIG. 13, when the freezing operation is performed, the condensed water and the dust on the surface of the indoor heat exchanger 110 may be frozen together. Then, when the freezing operation is finished and the defrosting operation (drying operation) is performed, as illustrated in (c) of FIG. 13, the frozen condensed water and the foreign substances on the surface of the indoor heat exchanger 110 may be separated from the surface of the indoor heat exchanger 110.

Figure 14:
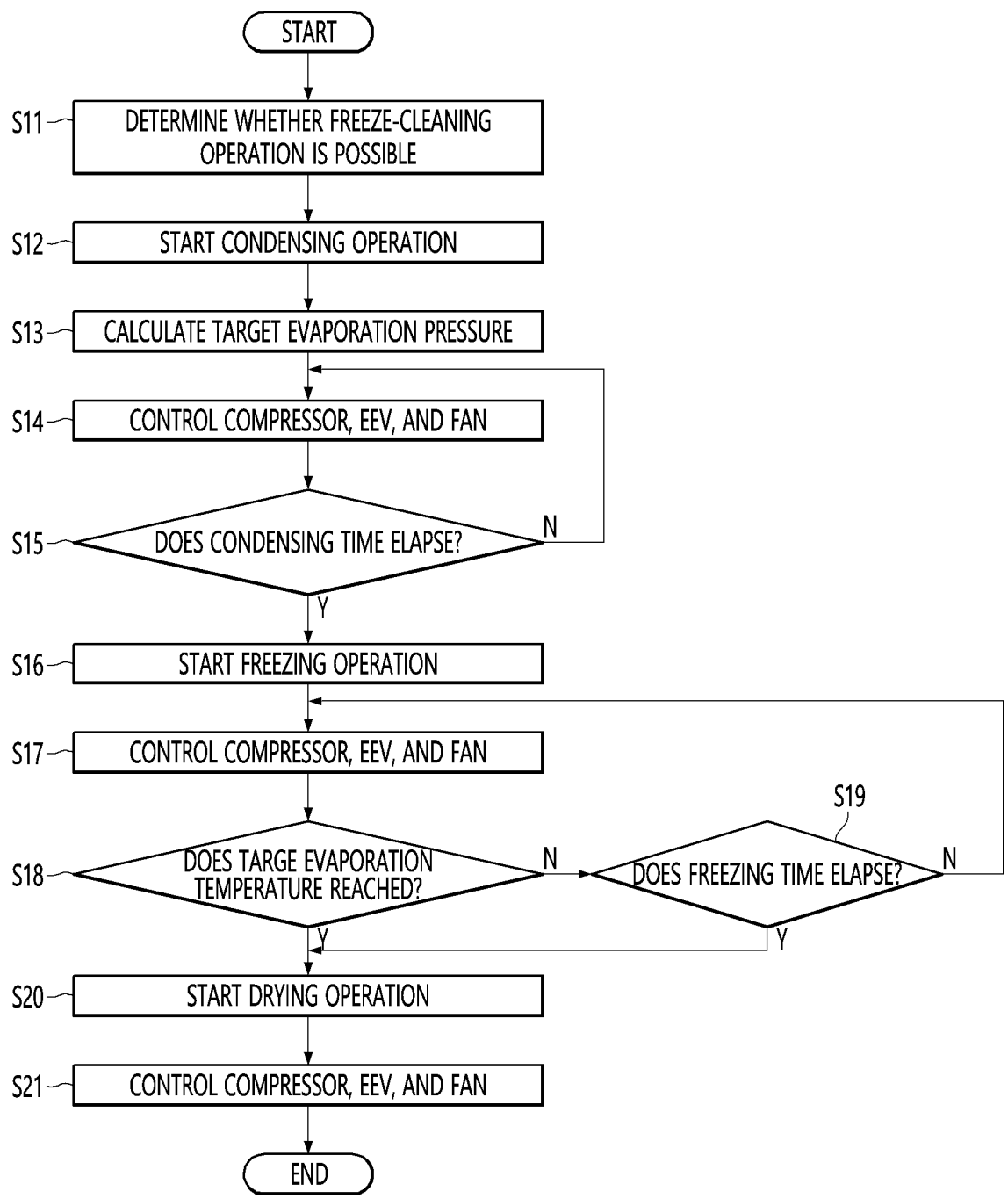
FIG. 14 is a flowchart illustrating a method for controlling an air conditioner according to an embodiment.
Figure 15:
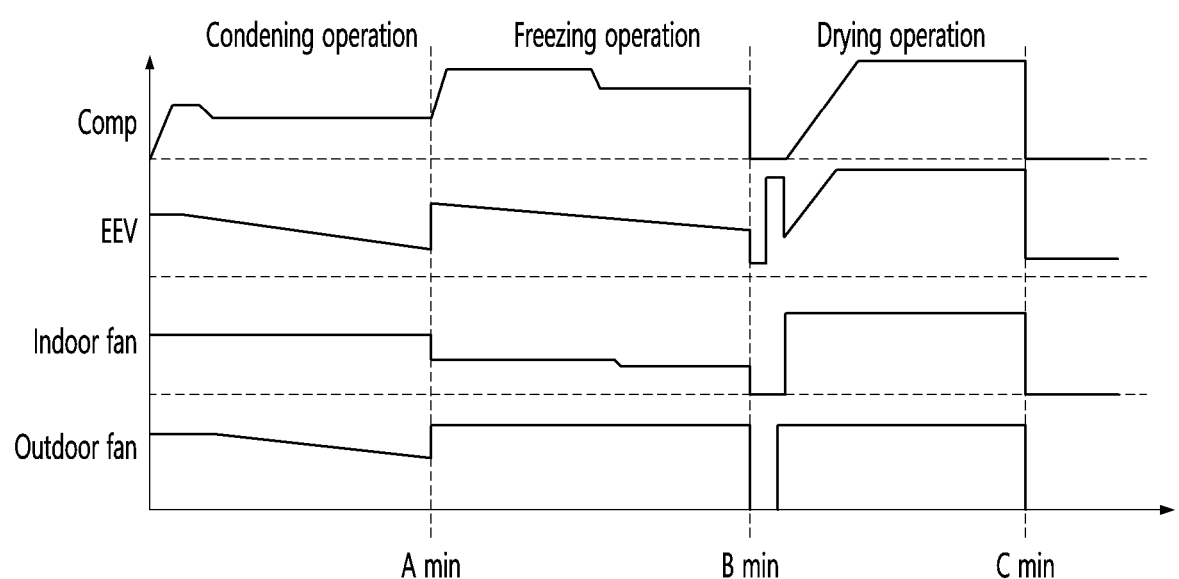
FIG. 15 is a view illustrating control operations of a compressor, an expansion valve, and a fan during a freeze-cleaning operation according to an embodiment.

FIG. 14 is a flowchart illustrating a method for controlling an air conditioner according to an embodiment, and FIG. 15 is a view illustrating control operations of a compressor, an expansion valve, and a fan during a freeze-cleaning operation according to an embodiment.

In FIG. 15, a horizontal axis of the graph corresponds to a time elapsing (min), and sections of a vertical axis of the graph corresponds to, respectively, a frequency (Hz) of the compressor, an opening rate of the expansion valve (%), a frequency (rotational speed) of the indoor fan, and a frequency (rotational speed) of the outdoor fan in a downward direction from above.

Referring to FIGS. 14 and 15, the air conditioner may determine whether the freeze-cleaning operation is possible (S11). For example, the air conditioner may determine whether the freeze-cleaning operation is possible based on room temperature and/or a relative humidity in the room.

For example, the air conditioner may determine that the freeze-cleaning operation is possible when a detected relative humidity is less than a reference humidity. If the freezing operation is performed when the relative humidity is too high (e.g., greater than the reference humidity), moisture in the air may be condensed due to a low air extraction temperature, resulting in a mist spray phenomenon. In addition, dew may be formed on an outer surface of the indoor unit or on the discharge vane under high humidity conditions, resulting in contamination of a product. The reference humidity may be, for example, about 70%, but is not limited thereto.

When it is determined that the freeze-cleaning operation is possible, the air conditioner starts the condensing operation (S12) and calculates a target evaporation pressure (S13). For example, to increase in amount of condensed water for the freeze-cleaning, moisture may be formed on the indoor heat exchanger. Therefore, the target evaporation pressure (or condensation evaporation pressure) below a dew point temperature may be calculated based on the temperature and humidity of indoor suction air (S12 and S13).

When the target evaporation pressure is calculated, the air conditioner controls the compressor, the expansion valve, and the fan (S14). For example, as illustrated in FIG. 15, a frequency (Hz) of the compressor 210 may be controlled based on the target evaporation pressure, a degree of opening of the expansion valve 250 may be controlled, and a rotational speed of each of the indoor fan 110 and the outdoor fan 240 may be controlled. Here, the rotational speed (or air volume) of the indoor fan 110 may be set higher than in the freezing operation so that condensation increases on the surface of the indoor heat exchanger 110.

For example, the air conditioner may determine whether a first reference time (condensation time) elapses from a starting time of the condensing operation (S15). The first reference time may be, for example, about 8 minutes, but is not limited thereto. When it is determined that the condensation time has not elapsed from the starting time of the condensing operation (S15—No), the air conditioner continues to control the compressor, the expansion valve, and the fan (S14) until the first reference time (condensation time) elapses from the starting time of the condensing operation.

When it is determined that the condensation time elapses from the starting time of the condensing operation (S15—Yes), the air conditioner starts the freezing operation (S16). The air conditioner may start the freezing operation for moisture condensed in the indoor heat exchanger and moisture in the suctioned air based on a target evaporation temperature (or freezing and evaporation temperature). For example, the target evaporation temperature may be set according to the room temperature and the operation conditions of the air conditioner during the condensing operation.

The air conditioner may control the compressor, the expansion valve (EEV), and the outdoor fan (S17), and the air conditioner may determine whether the target evaporation temperature is reached (S18). For example, the air conditioner may determine whether the target evaporation temperature is reached based on whether the temperature detected by the first tube temperature sensor 50 and/or the second tube temperature sensor 60 reaches the target evaporation temperature.

For example, in step S17, as illustrated in FIG. 15, a frequency (Hz) of the compressor 210, the degree of opening of the expansion valve 250, and the rotational speed of each of the indoor fan 110 and the outdoor fan 240 may be controlled at various levels during the freezing operation. If a current low pressure does not decrease after the freezing operation starts, the frequency of the compressor 210 may increase, and a descending operation of the indoor fan 120 may be performed. In this process, the degree of opening of the expansion valve 250 may be reduced, and an indoor air volume may be lowered so that the temperature of the indoor heat exchanger 110 may be maintained to be low, and frost occurs on the indoor heat exchanger 110. The rotational speed (or air volume) of the indoor fan 110 may be set to be lower than that of the condensing operation.

In one example, in the present disclosure, the first freezing mode M3 and the second freezing mode M4 may be performed sequentially or alternately in the freezing operation process so that the indoor heat exchanger 110 may be uniformly frozen. For example, in the case of the freezing operation according to an embodiment, the flow direction of the refrigerant of the indoor heat exchanger 110 and the rotational direction of the indoor fan 120 may be controlled in reverse directions to uniformly freeze the condensed water and foreign substances on the surface of the indoor heat exchanger 110 on the whole. Thus, the foreign substances such as dust on the entire surface of the indoor heat exchanger may be effectively removed.

If the target evaporation temperature is not reached (S18—No), the air conditioner determines whether a second reference time (freezing time) elapses from a starting time of the freezing operation (S19). The second reference time may be, for example, about 25 minutes, but is not limited thereto. When the air conditioner determines that the second reference time (freezing time) has not elapsed from a starting time of the freezing operation (S19—No), the air conditioner may continue to control the compressor, the expansion valve (EEV), and the outdoor fan (S17)

When either the target evaporation temperature is reached (S18—Yes), or the freezing time has elapsed from the staring time the freezing operation (S19—Yes) even when the target evaporation temperature is not reached, the air conditioner starts the drying operation (defrosting operation) (S20), and the air conditioner may control the compressor, the expansion valve (EEV), and the fan for the drying operation (S21). For example, as illustrated in FIG. 15, a frequency (Hz) of the compressor 210, the degree of opening of the expansion valve 250, and the rotational speed of each of the indoor fan 110 and the outdoor fan 240 may be controlled at various levels during the drying operation.

Figure 16:
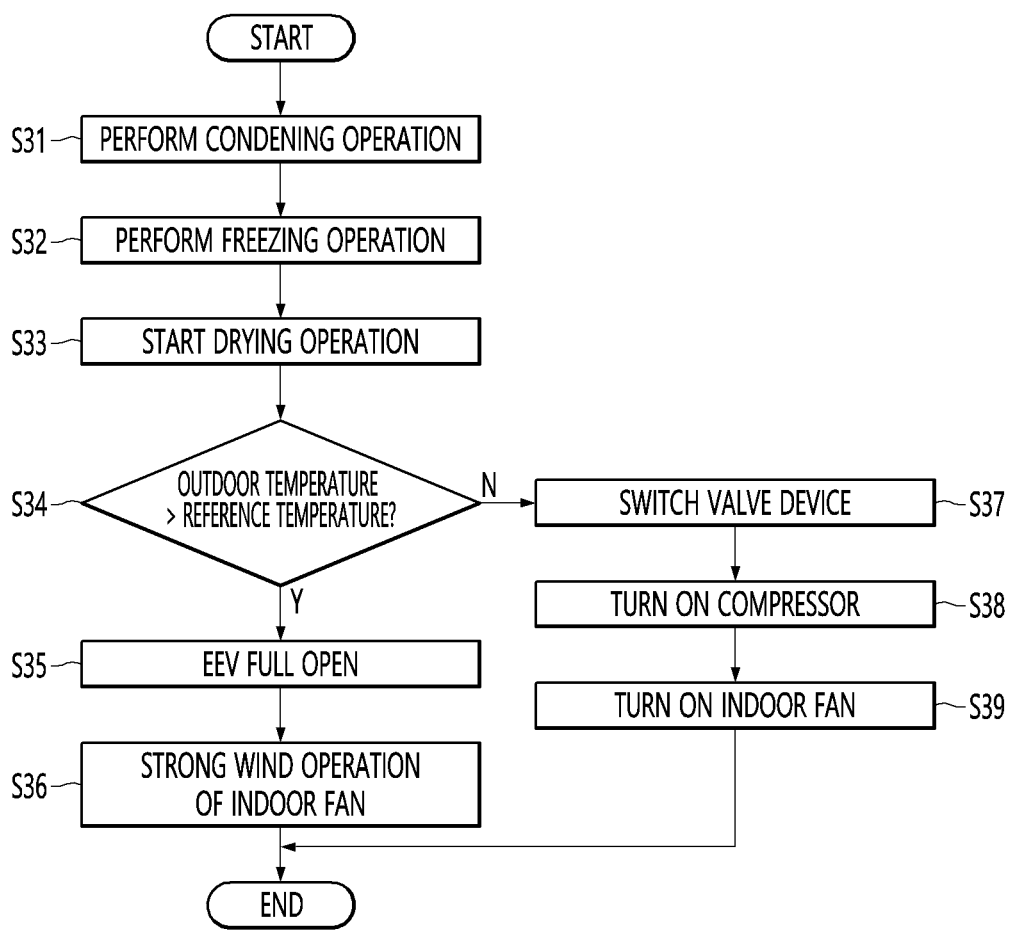
FIG. 16 is a flowchart illustrating a detailed control method of a drying operation according to an embodiment.

FIG. 16 is a flowchart illustrating a detailed control method of the drying operation according to an embodiment. Referring to FIG. 16, the air conditioner performs the above-described condensing operation and freezing operation for the freeze-cleaning (S31 and S32). For example, the air conditioner may perform operations S11 to S19 of FIG. 14.

When the freezing operation is ended, the air conditioner may start the drying operation (S33) and may determine whether the outdoor temperature is higher than the reference temperature (S34). For example, determining whether the outdoor temperature is higher than the reference temperature may be performed because it is difficult to secure reliability of the compressor in the case in which the defrosting is performed using the heating mode when the outdoor temperature is too high. For example, if the outdoor temperature is too high, the defrosting may be performed using the indoor fan (blowing and drying) without operating in the heating mode, and if the outdoor temperature is not high, the defrosting may be performed by operating in the heating mode (heating and drying). The reference temperature may be, for example, about 24° C., but is not limited thereto.

When the outdoor temperature is higher than the reference temperature (S34—Yes), the air conditioner may fully open the expansion valve (S35), and the indoor fan may operate to generate a strong air flow volume and/or velocity (S36). For example, when the outdoor temperature is higher than the reference temperature, the air conditioner may set the opening rate of the expansion valve 250 to about 100% or fully opened and set the indoor fan 120 to operate at a maximum rotational speed. Thus, the foreign substances such as dust adsorbed on the surface of the indoor heat exchanger 110 may be effectively removed and dried.

On the other hand, when the outdoor temperature is lower than the reference temperature (S34—No), the air conditioner switches the valve device and controls the compressor and the indoor fan (S37-S39). For example, the air conditioner may operate in the heating mode by switching the valve device 220 so that the indoor heat exchanger 110 functions as the condenser in S37 when the outdoor temperature is lower than the reference temperature. Also, the air conditioner may control the compressor 210 at a target pressure corresponding to the preset target condensation temperature in S38. Thus, the foreign substances such as dust on the surface of the indoor heat exchanger 110 may be effectively removed and dried. Thus, according to the configuration of the present disclosure, since the blowing and drying or the heating and drying may be selectively performed according to the outdoor temperature, the limitation that the reliability of the compressor is not secured due to the heating operation under the high temperature conditions may be solved, and the heat exchanger may be quickly dried.

Figure 17:
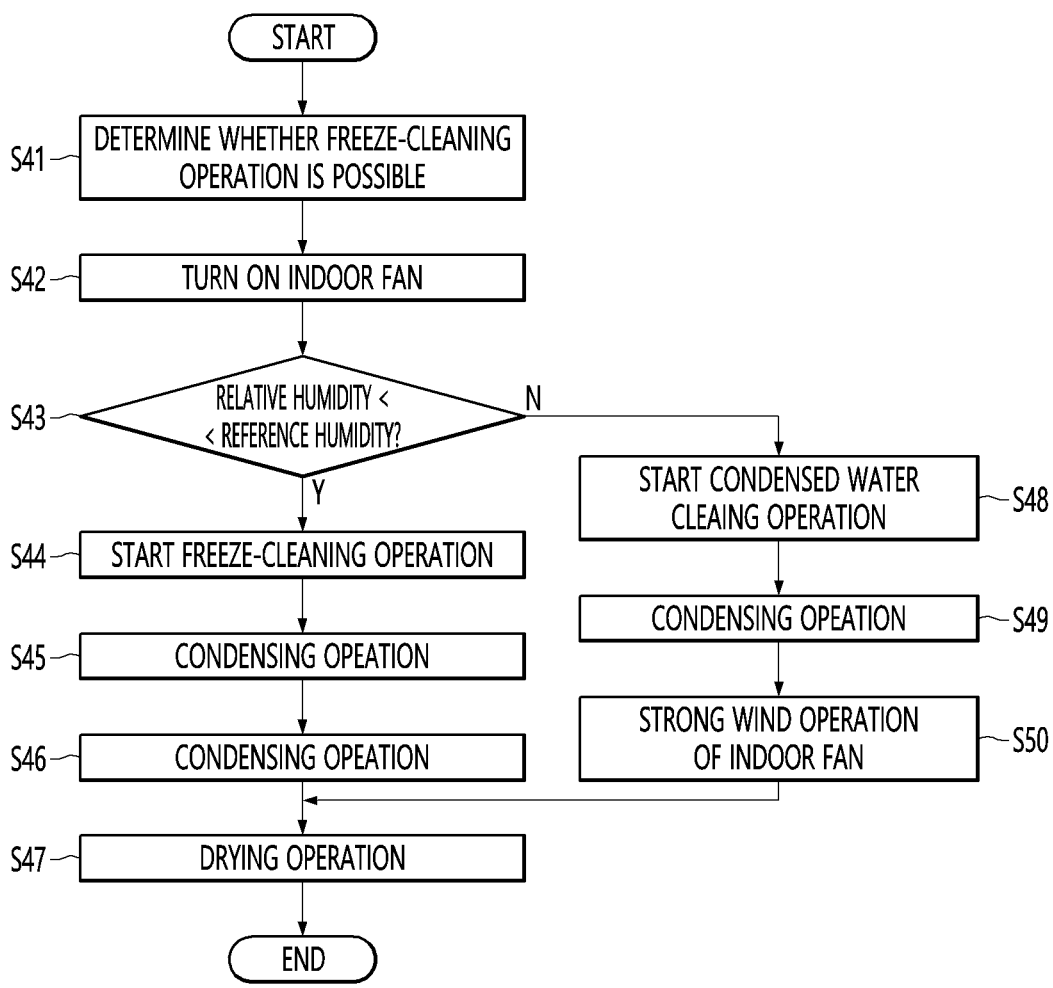
FIG. 17 is a flowchart illustrating a method for controlling an air conditioner according to another embodiment.

FIG. 17 is a flowchart illustrating a method for controlling an air conditioner according to an embodiment. Referring to FIG. 17, the air conditioner may determine whether a freeze-cleaning operation is possible (S41). For this determination, the air conditioner may drive the indoor fan (S42) and determines whether indoor humidity is less than a reference humidity (S43). For example, the air conditioner may determine that a freeze-cleaning operation is possible in S41 when the indoor relative humidity is less than the reference humidity, and may determine that a condensed water cleaning operation is possible when the indoor relative humidity is greater than or equal to the reference humidity.

Here, the condensed water cleaning operation may refer to an operation of omitting the previously described freezing operation and removing foreign substances from a surface of an indoor heat exchanger using condensed water through a condensing operation. When the freezing operation is performed in a state in which the relative humidity is too high, moisture in air may be condensed due to a low air extraction temperature, resulting in a mist spray phenomenon. In addition, dew may be formed on an outer surface of the indoor unit or on the discharge vane under high humidity conditions, resulting in contamination of a product. The reference humidity may be, for example, about 70%, but is not limited thereto.

When it is determined that the relative humidity is less than the reference humidity (S43—Yes), the air conditioner may start a freeze-cleaning operation (S45), and sequentially performs a condensing operation, a freezing operation, and a drying operation (S45-D47). For example, when the relative humidity is less than the reference humidity, the air conditioner may perform operations S12 to S21 of FIG. 14 described above.

On the other hand, when it is determined that the relative humidity is equal to or greater than the reference humidity (S43—No), the air conditioner may start a condensed water cleaning operation (S48) to perform a condensing operation (S49) and a strong wind operation of the indoor fan (S50). For example, when the condensed water cleaning operation starts in S48, the air conditioner may calculate a target evaporation pressure (or condensation evaporation pressure) that is equal to or less than a dew point temperature based on a temperature and humidity of indoor suction air so as to increase in amount of condensed water for performing condensed water cleaning.

When the target evaporation pressure is calculated, the air conditioner may control the compressor, expansion valve and fan to the target evaporation pressure at the target evaporation pressure. The air conditioner may set a rotational speed of the indoor fan 110 to a maximum value so that condensation increases on the surface of the indoor heat exchanger 110. The condensed water cleaning operation may be performed for a third reference time. The third reference time may be, for example, about 25 minutes, but is not limited thereto. When the condensed water cleaning operation is finished, operation S47 proceeds to perform a drying operation described above.

According to the configuration of the present disclosure, since the freeze-cleaning or condensed water cleaning is selectively performed according to the indoor humidity, there are advantages of preventing a mist spray phenomenon due to the freezing operation under the high humidity conditions and contamination of a product due to formation of dew on an outer surface or inner surface of the indoor unit from occurring.

The air conditioner including the above-described constituents according to the embodiment may have the following aspect. First, since the indoor heat exchanger may be uniformly frozen, the foreign substances such as the dust adsorbed throughout on the heat exchanger may be effectively removed. Particularly, the first freezing mode for freezing the one side of the heat exchanger and the second freezing mode for freezing the other side of the heat exchanger may be performed sequentially or alternately. Here, in the first freezing mode and the second freezing mode, since the flow direction of the refrigerant circulating inside the heat exchanger and the rotational direction of the fan provided at one side of the heat exchanger are opposite to each other, the heat exchanger may be quickly and uniformly frozen.

Second, since the freeze-cleaning operation is possible in consideration of the temperature and humidity, the freeze-cleaning operation range may be expanded, and the reliability of the compressor is improved. Third, since the blowing and drying or the heating and drying may be selectively performed according to the outdoor temperature, the limitation that the reliability of the compressor is not secured due to the heating operation under the high temperature conditions may be solved, and the heat exchanger is quickly dried. Fourth, since the freeze-cleaning or condensed water cleaning is selectively performed according to the indoor humidity, the mist spray phenomenon due to the freezing operation under the high humidity conditions and the contamination of the product due to formation of dew on the outer surface or inner surface of the indoor unit may be prevented from occurring.

Embodiments provide an air conditioner capable of uniformly freezing a heat exchanger provided in an indoor unit of the air conditioner. Embodiments also provide an air conditioner capable of maintaining reliability of a compressor even in the winter season in which an outdoor temperature is low. Embodiments also provide an air conditioner capable of preventing fog mist from occurring when freezing is performed under high humidity conditions. Embodiments also provide an air conditioner capable of quickly drying an indoor heat exchanger.

In one embodiment, an air conditioner includes: an outdoor unit comprising a compressor and an outdoor heat exchanger; and an indoor unit connected to the outdoor unit and provided with an indoor heat exchanger, wherein the indoor unit includes: a first refrigerant flow tube configured to connect an inlet side of the indoor heat exchanger to the outdoor unit; a second refrigerant flow tube configured to connect an outlet side of the indoor heat exchanger to the outdoor unit; a first bypass tube branched from a first branch point of the first refrigerant flow tube and joined to a first joining point of the second refrigerant flow tube; a second bypass tube branched from a second branch point of the first refrigerant flow tube and joined to a second joining point of the second refrigerant flow tube; and a flow switching valve disposed between the first joining point and the second joining point of the second refrigerant flow tube.

The outdoor unit may further include a valve device provided with a first port connected to an outlet side of the compressor, a second port connected to the outdoor heat exchanger, a third port connected to the indoor heat exchanger, and a fourth port connected to an inlet side of the compressor.

The outdoor unit may further include an expansion valve configured to connect the outdoor heat exchanger to the indoor heat exchanger. The first branch point may be disposed between the expansion valve and the indoor heat exchanger, and the first joining point may be disposed between the indoor heat exchanger and the flow switching valve. The second branch point may be disposed between the first branch point and the indoor heat exchanger, and the second joining point may be disposed between the flow switching valve and the valve device.

The indoor unit may further include a second bypass valve disposed in the second bypass tube. In a cooling mode and heating mode of the air conditioner, the first bypass valve and the second bypass valve may be closed, and the flow switching valve may be opened. In a freezing mode of the air conditioner, the first bypass valve and the second bypass valve may be opened, and the flow switching valve may be closed.

In a freezing mode of the air conditioner, the outdoor heat exchanger may serve as a condenser, and the indoor heat exchanger may serve as an evaporator. The freezing mode of the air conditioner may include a first freezing mode, in which one side of the indoor heat exchanger is frozen, and a second freezing mode, in which the other side of the indoor heat exchanger is frozen.

In the first freezing mode and the second freezing mode, flow directions of a refrigerant, which is circulated inside the indoor heat exchanger, may be opposite to each other. In the first freezing mode and the second freezing mode, rotational directions of an indoor fan provided at one side of the indoor heat exchanger may be opposite to each other.

In the first freezing mode, a refrigerant discharged from the outdoor heat exchanger may be introduced into the indoor heat exchanger and then be discharged to an outlet side of the indoor heat exchanger, and in the second freezing mode, the refrigerant discharged from the outdoor heat exchanger may be introduced into the outlet side of the indoor heat exchanger through the first bypass tube and then be discharged to the inlet side of the indoor heat exchanger and be introduced into an outlet side of the flow switching valve. The first freezing mode and the second freezing mode may be sequentially or alternately performed.

The indoor unit may further include a tube temperature sensor disposed at an inlet side or outlet side of the indoor heat exchanger, and the first freezing mode and the second freezing mode may be alternately performed according to a temperature detected by the tube temperature sensor.

In a cooling mode and freezing mode of the air conditioner, the valve device may be configured to connect the first port to the second port and connect the third port to the fourth port. In a heating mode and freezing mode of the air conditioner, the valve device may be configured to connect the first port to the third port and connect the second port to the fourth port.

When the freezing mode of the air conditioner is terminated, a defrosting mode in which the indoor heat exchanger is defrosted may be performed. When the defrosting mode of the air conditioner starts, it may be determined whether an outdoor temperature exceeds a reference temperature, when the outdoor temperature exceeds the reference temperature, blowing and drying using the indoor fan may be performed, and when the outdoor temperature does not exceed the reference temperature, the defrosting mode may be switched into a heating mode to perform heating and drying.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air conditioner, comprising:
   an outdoor unit comprising a compressor and an outdoor heat exchanger; and
   an indoor unit connected to the outdoor unit and comprising:
   an indoor heat exchanger,
   a first refrigerant flow tube configured to connect an inlet side of the indoor heat exchanger to the outdoor unit;

a second refrigerant flow tube configured to connect an outlet side of the indoor heat exchanger to the outdoor unit;

a first bypass tube branched from a first branch point of the first refrigerant flow tube and joined to a first joining point of the second refrigerant flow tube;

a second bypass tube branched from a second branch point of the first refrigerant flow tube and joined to a second joining point of the second refrigerant flow tube;

a first bypass valve provided on the first bypass tube;

a second bypass valve provided on the second bypass tube;

a flow switching valve positioned between the first joining point and the second joining point of the second refrigerant flow tube; and a check valve provided on the second bypass tube, wherein the check valve functions to restrict flow of the refrigerant to only one direction, wherein, in a cooling mode and a heating mode of the air conditioner, the first bypass valve and the second bypass valve are closed, and the flow switching valve is opened, wherein, in a freezing mode of the air conditioner, the first bypass valve and the second bypass valve are opened, and the flow switching valve is closed such that the refrigerant flowing through the first bypass tube is introduced into the outlet side of the indoor heat exchanger and then is discharged to the inlet side of the indoor heat exchanger, and the refrigerant flowing through the second bypass tube is introduced into an outlet side of the flow switching valve and then flows into a valve device of the outdoor unit.

2. The air conditioner according to claim 1, wherein the valve device includes a first port connected to an outlet side of the compressor, a second port connected to the outdoor heat exchanger, a third port connected to the indoor heat exchanger, and a fourth port connected to an inlet side of the compressor.

3. The air conditioner according to claim 2, wherein the outdoor unit further comprises an expansion valve provided on a connection tube configured to connect the outdoor heat exchanger to the first refrigerant flow tube of the indoor heat exchanger.

4. The air conditioner according to claim 3, wherein the first branch point is positioned between the expansion valve and the indoor heat exchanger, and the first joining point is positioned between the indoor heat exchanger and the flow switching valve.

5. The air conditioner according to claim 4, wherein the second branch point is positioned between the first branch point and the indoor heat exchanger, and the second joining point is positioned between the flow switching valve and the valve device.

6. The air conditioner according to claim 1, wherein, in the freezing mode of the air conditioner, the outdoor heat exchanger operates as a condenser, and the indoor heat exchanger operates as an evaporator.

7. The air conditioner according to claim 6, wherein the freezing mode of the air conditioner comprises a first freezing mode, in which the inlet side of the indoor heat exchanger is frozen, and a second freezing mode, in which the outlet side of the indoor heat exchanger is frozen.

8. The air conditioner according to claim 7,
wherein, in the first freezing mode, a refrigerant is circulated inside the indoor heat exchanger in a first direction, and wherein, in the second freezing mode, the refrigerant is circulated inside the indoor heat exchanger in a second direction that is opposite to the first direction.

9. The air conditioner according to claim 8, further comprising an indoor fan provided at a side of the indoor heat exchanger, wherein, in the first freezing mode, the indoor fan provided is operated in a first rotational direction, and wherein, in the second freezing mode, the indoor fan provided is operated in a second rotational direction that is opposite to the first rotational direction.

10. The air conditioner according to claim 7,
wherein, in the first freezing mode, a refrigerant discharged from the outdoor heat exchanger is introduced into the indoor heat exchanger and then is discharged to the outlet side of the indoor heat exchanger, and wherein, in the second freezing mode, the refrigerant discharged from the outdoor heat exchanger is introduced into the outlet side of the indoor heat exchanger through the first bypass tube and is discharged to the inlet side of the indoor heat exchanger and is then introduced into an outlet side of the flow switching valve.

11. The air conditioner according to claim 7, wherein the first freezing mode and the second freezing mode are sequentially performed.

12. The air conditioner according to claim 11, wherein the indoor unit further comprises a tube temperature sensor provided at the inlet side or the outlet side of the indoor heat exchanger, and the first freezing mode and the second freezing mode are alternately performed according to a temperature detected by the tube temperature sensor.

13. The air conditioner according to claim 6, wherein, when the freezing mode of the air conditioner is terminated, a defrosting mode in which the indoor heat exchanger is defrosted is performed.

14. The air conditioner according to claim 13, wherein, when the defrosting mode of the air conditioner starts, blowing and drying using the indoor fan are performed when an outdoor temperature exceeds a reference temperature, and the defrosting mode is switched into the heating mode to perform heating and drying when the outdoor temperature does not exceed the reference temperature.

15. The air conditioner according to claim 1,
wherein the valve device includes including a first port connected to an outlet side of the compressor, a second port connected to the outdoor heat exchanger, a third port connected to the indoor heat exchanger, and a fourth port connected to an inlet side of the compressor, and wherein, in the cooling mode and the freezing mode of the air conditioner, the valve device is configured to connect the first port to the second port and connect the third port to the fourth port.

16. The air conditioner according to claim 1,
wherein the valve device includes a first port connected to an outlet side of the compressor, a second port connected to the outdoor heat exchanger, a third port connected to the indoor heat exchanger, and a fourth port connected to an inlet side of the compressor, and wherein, in the heating mode and the freezing mode of the air conditioner, the valve device is configured to connect the first port to the third port and connect the second port to the fourth port.

17. The air conditioner according to claim 1,
wherein the check valve is disposed between the second bypass valve and the second joining point of the second refrigerant flow tube.

18. The air conditioner according to claim 1,
wherein, in the cooling mode and heating mode of the air conditioner, the check valve is closed, and
wherein, in the freezing mode of the air conditioner, the check valve is opened.

* * * * *